United States Patent

Kashima et al.

Patent Number: 6,147,804
Date of Patent: Nov. 14, 2000

[54] OPTICAL SHEET LAMINATION

[75] Inventors: Keiji Kashima; Fumihiro Arakawa, both of Tokyo, Japan

[73] Assignee: Dai Nippon Printing Co., Ltd., Tokyo, Japan

[21] Appl. No.: 09/358,697

[22] Filed: Jul. 21, 1999

Related U.S. Application Data

[62] Division of application No. 09/064,059, Apr. 22, 1998, Pat. No. 5,995,288.

[30] Foreign Application Priority Data

| Apr. 22, 1997 | [JP] | Japan | 9-104554 |
| Aug. 26, 1997 | [JP] | Japan | 9-229364 |
| Sep. 17, 1997 | [JP] | Japan | 9-252147 |
| Dec. 2, 1997 | [JP] | Japan | 9-331666 |

[51] Int. Cl.$^7$ ..................................................... G02B 5/02
[52] U.S. Cl. ..................... 359/599; 359/837; 359/536; 359/537; 359/538; 359/539
[58] Field of Search ................................. 359/599, 837, 359/536, 537, 538, 539, 69; 349/74, 64, 57, 86, 110, 112

[56] References Cited

U.S. PATENT DOCUMENTS

| 5,550,657 | 8/1996 | Tanaka et al. | 359/599 |
| 5,706,134 | 1/1998 | Konno et al. | 359/599 |

FOREIGN PATENT DOCUMENTS

| 56-157310 | 12/1981 | Japan . |
| 60-70601 | 4/1985 | Japan . |
| 2-33001 | 2/1990 | Japan . |
| 2-84618 | 3/1990 | Japan . |
| 3-5725 | 1/1991 | Japan . |
| 3-69184 | 3/1991 | Japan . |
| 5-73602 | 3/1993 | Japan . |
| 49307 | 7/1993 | Japan . |
| 5-169015 | 7/1993 | Japan . |
| 49403 | 3/1994 | Japan . |
| 7-151909 | 6/1995 | Japan . |
| 7-191319 | 7/1995 | Japan . |

*Primary Examiner*—Mohammad Y. Sikder
*Attorney, Agent, or Firm*—Oliff & Berridge, PLC

[57] ABSTRACT

In an optical sheet 10 having a prism surface 16 formed by providing unit prisms 14 on the upper surface of a transparent base material 12, a coating layer 18 is provided on the reverse surface of the transparent base material opposite to the prism surface 16, spherical beads 20 are arranged projecting from the surface of the coating layer 18 by 1 to 10 μm in height, and the coating layer 18 is brought into contact with the flat and smooth surface 22A of the light-transmissive material 22 through the spherical beads 20 which are put between them. The spherical beads are 1 μm or less in half bandwidth of the distribution of particle diameters and are made uniform in height projecting from the coating layer 18.

4 Claims, 19 Drawing Sheets

OPTICAL SHEET LAMINATION

This is a Division of application Ser. No. 09/064,059, filed Apr. 22, 1998, now U.S. Pat. No. 5,995,288. The entire disclosure of the prior application(s) is hereby incorporated by reference herein in its entirety.

BACKGROUND OF THE INVENTION

1. Field of the Invention

The present invention relates to an optical sheet and an optical sheet lamination ("lamination" includes stacking or putting on in not contact with another) composed of a prism sheet, a lens sheet and/or an optical diffusing sheet suitable for use in a back light surface light source used in illuminating from the back a light-transmissive type display panel of a light-transmissive type liquid crystal display apparatus, an advertising board or the like, and a surface light source device and a light-transmissive type display apparatus using the same optical sheet or optical sheet lamination.

2. Prior Art

In a liquid crystal display apparatus in recent years, according to necessity of reducing of its power consumption and making it thin and light in shape and weight, a surface light source for illuminating the liquid crystal display apparatus from the back has been naturally required also to be made thin and light in shape and weight and has been reduced in power consumption in its light source by effectively utilizing light from the light source for reduction of power consumption.

In response to such requirement, such techniques for directing light from a surface light source in a particular direction (in the normal direction to a light outputting surface in many cases) have been proposed as disclosed in Japanese laid-open publication Tokkaisho No. 60-70601, Tokkaihei No. 2-84618, Jikkaihei No. 3-69184, Tokkaihei No. 7-191319 and the like.

As a surface light source device used in a light-transmissive type liquid crystal display apparatus and the like there are light source devices of an edge-light type and of a direct back light type.

A surface light source device of an edge-light type, as disclosed in a Japanese laid-open publication Tokkaihei No. 3-5725, has a light-source light inputted into it usually through one side end surface of a plate-shaped light guide means of a transparent acryl resin or the like, leads the light to an light outputting surface which is the other surface of the light guide means, and therefrom outputs the light to the back surface of a liquid crystal panel or the like.

In such a case, in order to improve the efficiency of utilizing light, an optical reflector plate or an optical reflector film is often provided on the opposite surface of said light guide means to the light outputting surface and in order to make the output light uniform, a light diffusing sheet having a light diffusing function is often provided at the light outputting surface side of the light guide means, as disclosed in a Japanese laid-open publication Jikkaihei No. 5-73602 and the like, for example.

A surface light source device of a direct back light type, as disclosed in a Japanese laid-open publication Jikkaihei No. 2-33001 for example, generally reflects a light-source light onto the back surface of a liquid crystal panel or the like by means of a reflector plate and diffuses its output light by means of a light diffusing sheet disposed at the light outputting surface side so that the shape of the light source cannot be identified by human eyes.

Some of such surface light source devices of an edge-light type or a direct back light type as described above are provided with a prism sheet (prism film) or a lens sheet (lens film) which has an array of plural unit prisms or plural unit lenses arranged on the obverse surface of the light-transmissive base material of it in order to output light from a surface light source collectively in a particular direction, as described above.

Various applications of such optical sheets have been proposed in combination of plural optical sheets and in direction of setting the side at which unit prisms or unit lenses are formed (prism side or lens side) with regard to the light source side.

In such an optical sheet as described above, the opposite surface (reverse surface) to the prism surface or lens surface is often formed into a flat and smooth surface.

In an optical sheet as described above, a pattern where bright and dark parts are alternately repeated by light from a surface light source is observed in case of combination of a light guide means, a diffusing sheet, another optical sheet and the like, and a problem that an image composed of pixels is disarranged has been caused by this in case that such an optical sheet is used in a liquid crystal display apparatus, for example. On the other hand, as disclosed in a Japanese laid-open publication Tokkaihei No. 7-151909 for example, a method for solving this problem has been proposed on the assumption that said pattern of repeating bright and dark parts is caused by interference fringes generated by an outside light source between the prism surface of one prism sheet and the flat and smooth surface of the other prism sheet in case of using two prism sheets, for example.

When we have checked this assumption, however, a pattern of repeating bright and dark parts has been observed in a surface light source device even in a darkroom where no light enters from any outside light source.

That is to say, we have confirmed that interference fringes are generated by a surface light source rather than an outside light source and further generated between the flat and smooth surface of a prism sheet and the flat and smooth face of a light guide plate or the flat and smooth surface of a diffusing plate or other prism sheets.

On the other hand, a method of forming minute rugged parts satisfying a particular condition on the flat and smooth surface of a prism sheet is also conceivable as disclosed in said Tokkaihei No. 7-151909, but in this case, there is a problem that the primary function of a prism sheet for improving the brightness by collecting light from a surface light source in a particular direction, for example, in the normal direction to the light outputting surface is deteriorated.

As for the light outputting side, many existing prism sheets as described above are made so as to cover defects (flaws, stains and the like) of a prism sheet by laminating a light diffusing sheet on the prism surface side which is a light outputting surface and are somewhat weakened in directivity of their light outputting characteristics.

Such a prism sheet having a light diffusing sheet laminated on it has a problem that a prism (or lens) part touching the light diffusing sheet is damaged by a rugged part on the surface of the light diffusing sheet and this flaw deteriorates a uniform and flat light-emitting state as a whole.

On the other hand, although a method of forming the prism sheet side of a light diffusing sheet into a flat and smooth surface in the same way as the light inputting surface of said prism sheet is also conceivable, such a method as this has not come to be in practical use since there is a problem that interference fringes or moire patterns are generated between the flat and smooth surface of said light diffusing sheet and the flat and smooth surface of a light guide plate or the flat and smooth surface of a prism sheet.

SUMMARY OF THE INVENTION

The present invention has been performed in consideration of the above-mentioned existing problems, and an object of the invention is to provide an optical sheet and an optical sheet lamination (in the present invention, "lamination" includes stacking or putting on in not contact with another) which are made so as to suppress deterioration in brightness of the light outputting side and generation of interference fringes and so as not to damage other prism sheets being in contact with them, and a surface light source device and a light-transmissive type display apparatus using the same optical sheet and optical sheet lamination.

The present invention attains the above-mentioned object by means of an optical sheet which has one surface of its light-transmissive base material on which at least one of a group of plural unit prisms and a group of plural unit lenses is arranged and the other surface of it coated with a coating layer formed out of light-transmissive materials, wherein said coating layer is composed of a light-transmissive resin and light-transmissive fine particles dispersed in this light-transmissive resin, and at least part of said fine particles form a number of fine knoll-shaped projections of 1 to 10 $\mu$m in height projecting from said surface by being projected from the opposite surface of said coating layer to the light-transmissive base material.

The coating layer in said optical sheet may be 2 to 20 $\mu$m in thickness including said fine knoll-shaped projections.

The fine knoll-shaped projections in said optical sheet may be disposed at random along said surface of said coating layer.

At least part of the fine particles in said optical sheet may be composed of light-transmissive beads of 1 to 10 $\mu$m in particle diameter.

The fine particles in said optical sheet may be composed of spherical beads of 1 $\mu$m or less in half bandwidth of the distribution of particle diameters.

The ratio of the refractive index of a material forming the fine particles in said optical sheet to the refractive index of a light-transmissive resin of said coating layer may be 0.9 to 1.1.

The coating layer in said optical sheet may be formed by applying and drying an ink to the reverse surface of said light-transmissive base material, said ink being obtained by mixing with each other said light-transmissive resin and said light-transmissive beads less in specific gravity than this resin, and said fine knoll-shaped projections are formed by projecting said light-transmissive beads from said ink-coated film which has dried and contracted.

At least part of fine particles in said optical sheet may be formed out of light-transmissive beads, and said light-transmissive beads are distributed unevenly more at the opposite surface side of said coating layer to the light-transmissive base material and projected from said surface.

The coating layer in said optical sheet may be formed by applying an ink obtained by mixing with each other said light-transmissive resin and said light-transmissive beads less in specific gravity than this resin to the reverse surface of said light-transmissive base material so as to be pressed by gravity, and by hardening the ink after said light-transmissive beads come to be distributed unevenly more in the vicinity of the surface after the ink has been applied.

The present invention attains the above-mentioned object by means of an optical sheet which has one surface of its light-transmissive base material on which at least one of a group of plural unit prisms and a group of plural unit lenses is arranged and the other surface of it coated with a coating layer formed out of light-transmissive materials, wherein said coating layer is composed of a light-transmissive resin and light-transmissive beads which are dispersed in this light-transmissive resin, 1 to 10 $\mu$m in particle diameter and 1 $\mu$m or less in half bandwidth of the distribution of particle diameters, and at least part of said light-transmissive beads are projected from the opposite surface of said coating layer to the light-transmissive base material and thereby many fine knoll-shaped projections of 1 to 10 $\mu$m in height projecting from said surface are formed and said coating layer is formed to be 2 to 20 $\mu$m in thickness including said fine knoll-shaped projections, and the ratio of the refractive index of a material forming said light-transmissive beads to the refractive index of the light-transmissive resin in the coating layer is 0.9 to 1.1.

The light-transmissive beads in said optical sheet may be distributed unevenly more at the opposite surface side of said coating layer to the light-transmissive base material and projected from said surface.

And the present invention attains the above-mentioned object by means of an optical sheet having a light-transmissive base material having one surface having a light diffusing layer on it and the other surface covered with a coating layer formed out of a light-transmissive material, said coating layer comprising light-transmissive spherical beads of 1 $\mu$m or less in half bandwidth of the distribution of particle diameters.

The light diffusing layer in said optical sheet may be formed so as to contain light-transmissive beads, and the average particle diameter of the light-transmissive spherical beads in this light diffusing layer may be made larger than the average particle diameter contained in said coating layer.

The spherical beads contained in the coating layer in said optical sheet may be 1 to 10 $\mu$m in particle diameter.

The present invention attains the said object by means of an optical sheet lamination which is formed by laminating together plural optical sheets containing unit prisms or unit lenses, wherein each optical sheet has plural unit prisms or unit lenses arranged on one surface of a light-transmissive base material and the other surface being covered with a coating layer formed out of a light-transmissive material, said coating layer contains light-transmissive spherical beads of 1 $\mu$m or less in half bandwidth of the distribution of particle diameters, and said coating layer in the laminated optical sheet is in contact with unit prisms or unit lenses of another optical sheet laminated adjacently to it.

Moreover, the present invention attains the said object by means of an optical sheet lamination which is formed by laminating together one or more optical sheets each of which has a light-transmissive base material having one surface having a light diffusing layer on it and the other surface covered with a coating layer formed out of light-transmissive materials, said coating layer containing light-transmissive spherical beads of 1 $\mu$m or less in half bandwidth of the distribution of particle diameters, and one or more optical sheets each of which has plural unit prisms or plural unit lenses arranged on the surface of a light-transmissive base material, wherein said coating layer in an laminated optical sheet is in contact with unit prisms or unit lenses of another optical sheet laminated adjacently to it.

The vertical angle of the tops of said prisms or lenses of the optical sheets being in contact with the coating layer of another optical sheet may be as sharp as 100° or less.

And the present invention attains the said object by means of a surface light source device composed of a light source for outputting light from its light outputting surface and an optical sheet provided adjacently to said light outputting surface, said optical sheet having one surface of a light-transmissive base material on which at least one of a group of plural unit prisms and a group of plural unit lenses is arranged and the other surface being covered with a coating layer formed out of light-transmissive materials, wherein said coating layer is composed of a light-transmissive resin and light-transmissive fine particles dispersed in this light-transmissive resin, and at least part of said fine particles are formed into many fine knoll-shaped projections of 1 to 10 $\mu$m in height projecting from said surface by being projected from the opposite surface of said coating layer to the light-transmissive base material.

The coating layer in said optical sheet may be 2 to 20 $\mu$m in thickness including said fine knoll-shaped projections.

At least part of the fine particles in said surface light source device may be light-transmissive beads of 1 to 10 $\mu$m in particle diameter.

Said fine particles in the coating layer of said surface light source device may be spherical beads of 1 $\mu$m or less in half bandwidth of the distribution of particle diameters.

The ratio of the refractive index of a material forming the fine particles in said surface light source device to the refractive index of a light-transmissive resin of said coating layer may be 0.9 to 1.1.

At least one lens sheet which has one surface of a light-transmissive base material in said surface light source on which at least one of a group of plural unit prisms and a group of plural unit lenses arranged, and the other surface being made flat and smooth without raggedness by being covered with a coating layer formed out of a light-transmissive material is put between said optical sheet and said light outputting surface.

A light source in said surface light source device may be composed of a light guide means which is a plate-shaped member one of whose surface is said light outputting surface and which outputs a light introduced through at least one side end surface from said light outputting surface, and a light generating source for inputting light into said light guide means through at least said one side end surface of said light guide means.

A light diffusing sheet may be disposed on the light outputting surface of the light source in said surface light source device and the light outputted through said light diffusing sheet from said light outputting surface may be inputted from said coating layer side.

At least part of said fine particles in said surface light source device may be formed out of light-transmissive beads, and said light-transmissive beads may be distributed unevenly more at the opposite surface side of said coating layer to the light-transmissive base material and may be formed into many fine knoll-shaped projections by being projected from said surface.

The present invention attains the said object by means of a surface light source device composed of a light source for outputting light from its light outputting surface and an optical sheet provided adjacently to said light outputting surface, said optical sheet having one surface of a light-transmissive base material on which at least one of a group of plural unit prisms and a group of plural unit lenses is arranged and the other surface being covered with a coating layer formed out of light-transmissive materials, wherein said coating layer comprises light-transmissive spherical beads of 1 $\mu$m or less in half bandwidth of the distribution of particle diameters and the light outputted from said light outputting surface is inputted from said coating layer side.

Said light diffusing layer in said surface light source device may comprise light-transmissive spherical beads, and the average particle diameter of the light-transmissive spherical beads in said light diffusing layer may be larger than the average particle diameter of the spherical beads contained in said coating layer.

The spherical beads contained in the coating layer in said surface light source device may be 1 to 10 $\mu$m in particle diameter.

The present invention attains the said object by means of a surface light source device composed of a light source for outputting light from its light outputting surface and an optical sheet provided adjacently to said light outputting surface, said optical sheet having one surface of a light-transmissive base material on which at least one of a group of plural unit prisms and a group of plural unit lenses is arranged and the other surface being covered with a coating layer formed out of light-transmissive materials, wherein said coating layer contains a light-transmissive resin and light-transmissive beads, dispersed in this light-transmissive resin, of 1 to 10 $\mu$m in particle diameter and 1 $\mu$m or less in half bandwidth of the distribution of particle diameters, and at least part of said light-transmissive beads are formed into many fine knoll-shaped projections of 1 to 10 $\mu$m in height projecting from the opposite surface of said coating layer to the light-transmissive base material by being projected from said opposite surface, and said coating layer is 2 to 20 $\mu$m in thickness including said fine knoll-shaped projections, and the ratio of the refractive index of a material forming said light-transmissive beads to the refractive index of the light-transmissive resin in the coating layer is 0.9 to 1.1.

The light-transmissive beads in said surface light source device may be distributed unevenly more at the opposite surface side of said coating layer to the light-transmissive base material and projected from said surface.

The vertical angle of the tops of said prisms or lenses of the optical sheets being in contact with the coating layer of another optical sheet may be as sharp as 100° or less.

The present invention attains the said object by means of a light-transmissive type display apparatus composed of a flat light-transmissive display means and a surface light source device which is disposed at the back of said light-transmissive display means and irradiates said light-transmissive display means from the back with its output light, wherein said surface light source device is composed of a light source for outputting light from its light outputting surface and an optical sheet provided adjacently to said light outputting surface, said optical sheet having one surface of a light-transmissive base material on which at least one of a group of plural unit prisms and a group of plural unit lenses is arranged and the other surface being covered with a coating layer formed out of light-transmissive materials, and light-transmissive fine particles different from a material for the coating layer are disposed on the opposite surface of said coating layer to the light-transmissive base material and thereby many fine knoll-shaped projections of 1 to 10 $\mu$m in height projecting from said surface are formed, and the light outputted from said light outputting surface is inputted from said coating layer side.

Said coating layer of the optical sheet in said light-transmissive type display apparatus may be 2 to 20 $\mu$m in thickness including said fine knoll-shaped projections.

At least part of said fine particles of the optical sheet in said light-transmissive type display apparatus may be light-transmissive beads of 1 to 10 $\mu$m in particle diameter.

Said fine particles of the coating layer of the optical sheet in said light-transmissive type display apparatus may be spherical beads of 1 μm or less in half bandwidth of the distribution of particle diameters.

The ratio of the refractive index of a material forming said fine particles of the optical sheet in said light-transmissive type display apparatus to the refractive index of the light-transmissive resin of the coating layer may be is 0.9 to 1.1.

At least one lens sheet which has one surface of a light-transmissive base material in said light-transmissive display apparatus on which at least one of a group of plural unit prisms and a group of plural unit lenses is arranged and the other surface being made flat and smooth without raggedness by being covered with a coating layer of a light-transmissive material may be put between said optical sheet and said light outputting surface in said surface light source device.

Said light source of said surface light source device in said light-transmissive type display apparatus may be composed of a light guide means which is a plate-shaped member, formed out of a light-transmissive material, having one surface of it as said light outputting surface and outputs a light inputted from at least one side end surface through said light outputting surface, and a light generating source for inputting light from at least said one side end surface of said light guide means into it.

A light diffusing sheet may be disposed on the light outputting surface of said light source in said light-transmissive type display apparatus, and a light outputted through said light diffusing sheet from said light outputting surface may be inputted from said coating layer side.

At least part of said fine particles of the optical sheet in said light-transmissive type display apparatus may be formed out of light-transmissive beads, and said light-transmissive beads may be distributed unevenly more at the opposite surface side of said coating layer to the light-transmissive base material, and formed into said many fine knoll-shaped projections by being projected from said surface.

The present invention attains the said object by means of a light-transmissive type display apparatus provided with a flat light-transmissive display means and a surface light source device which is disposed at the back of this light-transmissive display means and irradiates said light-transmissive display means from the back with its output light, wherein said surface light source device is composed of a light source for outputting light from its light outputting surface and an optical sheet provided adjacently to said light outputting surface, wherein said optical sheet has one surface of a light-transmissive base material on which a light diffusing sheet is provided and the other surface being covered with a coating layer of light-transmissive materials, and said coating layer contains light-transmissive spherical beads of 1 μm or less in half bandwidth of the distribution of particle diameters, and at least part of these spherical beads are projected from the opposite surface of said coating layer to the light-transmissive base material and are formed into many fine knoll-shaped projections of 1 to 10 μm in height projecting from said surface, and the light outputted from said light outputting surface is inputted from said coating layer side.

Said light diffusing layer of the optical sheet in said light-transmissive type display apparatus may contain light-transmissive spherical beads, and the average particle diameter of the light-transmissive spherical beads in said light diffusing layer may be made larger than the average particle diameter of the spherical beads contained in said coating layer.

The spherical beads contained in said coating layer of the optical sheet in said light-transmissive type display apparatus may be 1 to 10 μm in particle diameter.

The present invention attains the said object by means of a light-transmissive type display apparatus provided with a flat light-transmissive display means and a surface light source device which is disposed at the back of this flat light-transmissive display means and irradiates said light-transmissive display means from the back with its output light, wherein said surface light source device is composed of a light source for outputting light from its light outputting surface and an optical sheet provided adjacently to said light outputting surface, said optical sheet has one surface of a light-transmissive base material on which at least one of a group of plural unit prisms and a group of plural unit lenses is arranged and the other surface being covered with a coating layer formed out of light-transmissive materials, said coating layer is composed of a light-transmissive resin and light-transmissive beads which are dispersed in this light-transmissive resin and are 1 to 10 μm in particle diameter and 1 μm or less in half bandwidth of the distribution of particle diameters, and at least part of said light-transmissive beads are formed into many fine knoll-shaped projections of 1 to 10 μm in height projecting from the opposite surface of said coating layer to the light-transmissive base material by being projected from said surface, and said coating layer is 2 to 20 μm in thickness including said fine knoll-shaped projections, and the ratio of the refractive index of a material forming said light-transmissive beads to the refractive index of the light-transmissive resin in said coating layer is 0.9 to 1.1.

Said light-transmissive beads of the optical sheet in said light-transmissive type display apparatus may be distributed unevenly more at the opposite surface side of said coating layer to the light-transmissive base material and may be projected from said surface.

According to the present invention, since many fine knoll-shaped projections of 1 to 10 μm in height are provided on a coating layer covering the reverse surface opposite to the lens surface of a lens sheet, a gap of 1 to 10 μm is formed between said reverse surface and the flat and smooth surface of a light guide plate, a light diffusing plate, another lens sheet or the like disposed adjacently to said reverse surface, and thereby the distance between said reverse surface and the flat and smooth surface of a light guide plate or the like is kept so that no interference is generated between an advancing light and a reflected light and thus generation of interference fringes or Newton's rings can be prevented.

The vertical angle of the tops of said prisms or lenses of the optical sheets being in contact with the coating layer of another optical sheet may be as sharp as 100° or less.

According to the present invention, since light-transmissive beads are distributed unevenly more at the vicinity of the surface of a coating layer in case of providing many fine knoll-shaped projections of 1 to 10 μm in height by distributing the light-transmissive beads in the coating layer covering the reverse surface opposite to the prism surface of a prism sheet, the invention is economical and efficient thanks to doing with a small amount of beads to be used, and can suppress a phenomenon of deteriorating the primary function of a prism sheet of improving the brightness of a display screen by collecting light in the direction perpendicular to the light outputting surface which phenomenon comes into question in case of forming a light diffusing layer on the reverse surface opposite to its prism surface of a prism sheet. Since the coating layer is hardened and formed in a state where an ink containing light-transmissive beads smaller in specific gravity than the light-transmissive resin is applied to the light-transmissive base material and the light-transmissive beads have come up to the surface of the ink thanks to the difference in specific gravity between them, it is possible to easily and surely distribute the light-transmissive beads unevenly more in the vicinity of the surface of the coating layer.

According to the present invention, since spherical beads are contained in a coating layer which covers the reverse surface opposite to the lens surface or the prism surface of an optical sheet or the reverse surface of an optical sheet having a light diffusing layer on its obverse surface, a small gap is formed between said reverse surface and the flat and smooth surface of a light guide plate, a light diffusing plate, another prism sheet or the like disposed adjacently to said reverse surface, and a light diffusing effect by the spherical beads prevents interference between an advancing light and a reflected light due to a distance between said reverse surface and the flat and smooth surface of a light guide plate or the like and prevents generation of interference fringes or Newton's rings. And since the spherical beads contained in the coating layer are 1 $\mu$m or less in half bandwidth of the distribution of particle diameters, the projections from the reverse surface of an optical sheet vary a little in height and are uniformly in contact with another optical sheet such as a prism sheet or the like, and therefore a trouble is prevented that a prism or the like of another optical sheet is broken by a concentrated load caused by a greatly projected spherical bead.

The vertical angle of the tops of said prisms or lenses of the optical sheets being in contact with the coating layer of another optical sheet may be as sharp as 100° or less.

DETAILED DESCRIPTION OF THE PREFERRED EMBODIMENTS

Embodiments of the present invention are described in detail with reference to the drawings in the following.

Figure 1:
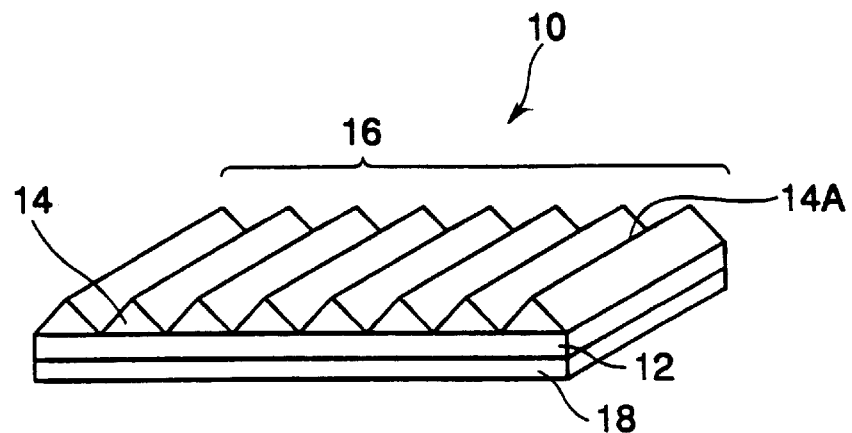
FIG. 1 is a perspective view magnifying part of an optical sheet having a prism surface according to embodiment of the present invention.
Figure 2:
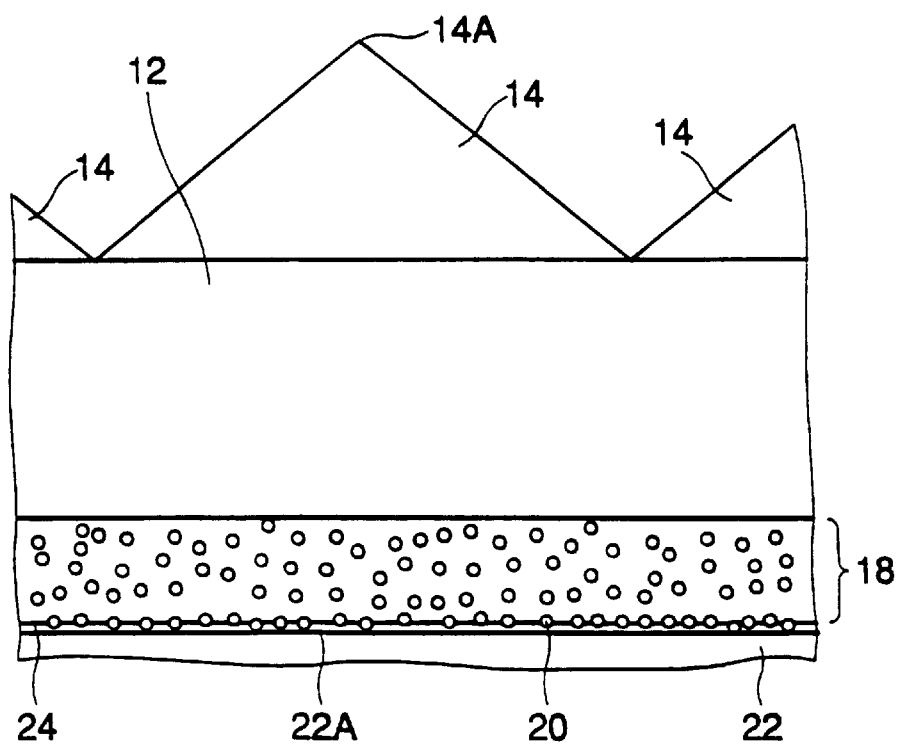
FIG. 2 is a sectional view further magnifying part of the same optical sheet.

As shown in FIGS. 1 and 2, an optical sheet 10 according to the present invention forms a prism surface 16 by arranging many unit prisms 14 each of which is in the shape of a triangular prism on one surface (the upper surface in FIGS. 1 and 2) of a transparent base material sheet 12 adjacently to one another in a one-dimensional direction so that their ridge-lines 14A are in parallel with one another, and a coating layer 18 is provided on the reverse surface opposite to this prism surface 16 and moreover this coating layer 18 contains spherical beads 20 formed out of a light-transmissive material which are 1 to 10 μm in particle diameter and 1 μm or less in half bandwidth of the distribution of particle diameters.

Figure 3A:
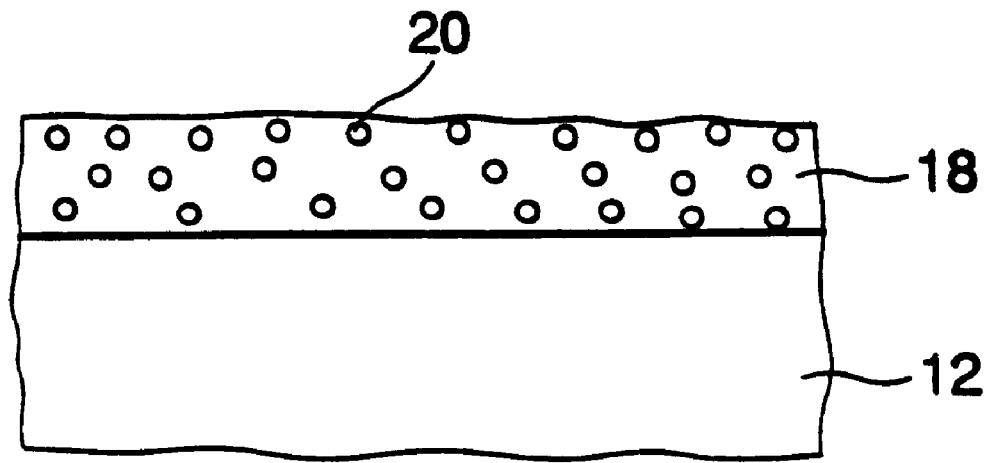
FIGS. 3a and 3b are sectional views showing a process of forming a coating layer in the same optical sheet.
Figure 3B:
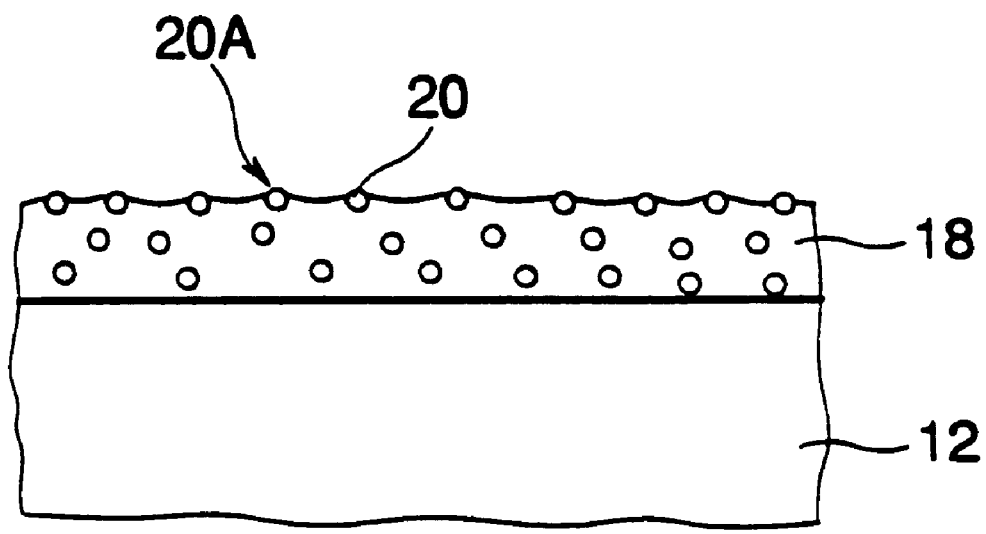

And part of the spherical beads 20 distributed two-dimensionally at random on the surface of said coating layer 18 are projected from said surface and formed into many knoll-shaped projections 20A as shown in FIG. 3(B). In case of disposing said optical sheet 10 so as to bring its coating layer 18 side into contact with a flat and smooth surface 22A of another light-transmissive material 22, for example, a light guide plate, a light diffusing sheet or another prism sheet, in the prior art as described above, interference fringes have been generated by a surface light-source light from said light guide plate or the like, but in an optical sheet 10 of the present invention as shown in FIG. 2, the flat and smooth surface 22A of a light-transmissive material 22 of a light guide means or the like comes into contact with the spherical beads 20 projecting from the surface of the coating layer 18, a gap 24 of 1 to 10 μm or so is generated without fail between said flat and smooth surface 22A and the surface of the coating layer 18.

Accordingly, even when light is inputted through the opposite side of the light-transmissive material 22 to the flat and smooth surface 22A (through the lower side in FIG. 2), the gap 24 prevents generation of interference fringes in cooperation with a light diffusing effect of the spherical beads.

Since the spherical beads 20 are made so as to be 1 μm or less in half bandwidth of the distribution of particle diameters, variation in height of the projections of the spherical beads 20 from the surface of the coating layer 18 becomes 1 μm or less.

Accordingly, when said spherical beads 20 come into contact with the tops of prism parts on another prism sheet or the flat and smooth surface of another light-transmissive material, their contact state is uniform and therefore there is not a trouble that a concentrated load is caused by contact with a greatly projected spherical bead and a prism part of a prism sheet or the like is prevented from being damages, even if vertical angle of the tops of the prism parts of the another prism sheet is as sharp as 100° or less.

Hereupon, the reason why the projections of said spherical beads 20 are made 1 μm or more in height from the surface of the coating layer 18 is that a height of less than 1 μm causes a problem that said gap 24 being close to the wavelength of a surface light-source light (visible light) makes color appear, a problem that it becomes difficult to mass-produce light-transmissive beads (acryl beads for example) as a material for the spherical beads 20, and a problem that such fine beads are difficult to be dispersed in a binder (described later) forming the coating layer 18. Furthermore, the reason is also to avoid a problem that a uniform brightness in the surface cannot be kept due to a fact that a light from the light-transmissive material comes directly into the coating layer 18 as an evanescent wave.

The reason why the spherical beads 20 are 10 μm or less in particle diameter is that the gap 24 being larger than 10 μm in particle diameter deteriorates greatly an effect of collecting light from the surface light source in a particular direction, for example, the normal direction to the light outputting surface at the prism surface 16 side.

In case of providing the spherical beads 20 on the coating layer 18, light-transmissive beads or the like forming said spherical beads 20 are mixed with a binder and then applied to the reverse surface of the optical sheet 10 (described later), and in this case projections of the spherical beads 20 vary in height, and the height of the projections is referred to as the 10-point average roughness Rz according to JIS B0601 of the Japanese Industrial Standards.

As said spherical beads 20 are not arranged periodically but two-dimensionally at random on the surface of the coating layer 18.

If the spherical beads 20 are arranged periodically on the coating layer 18 and this arrangement period nearly coincides with the period in arrangement of the unit prisms 14, moire fringes appear.

For example, in case of providing such an optical sheet as described above at the light outputting surface side of the back light of a color liquid crystal display apparatus, when the spherical beads 20 are periodically arranged there is a possibility that moire fringes are caused by a fact that the period in arrangement of the spherical beads 20 nearly coincides with the period in arrangement of pixels of the color liquid crystal display apparatus.

In the optical sheet 10 according to the present invention, since the spherical beads 20 are disposed two-dimensionally at random, such moire fringes as described above are not generated.

As transparent materials for a transparent base sheet 12, unit prisms 14 and spherical beads 20 forming said optical sheet, materials good in transparency are used, said materials being selected out of resins obtained by hardening ionizing-radiation setting resins composed of such polymer resins as polyethylene terephtalate, polybutylene terephtalate and the like, such acryl resins as polymethyl methacrylate and the like, such thermoplastic resins as polycarbonate resin, polystyrene resin, polymethyl pentene resin and the like, and such oligomer and/or monomer resins of acrylate system as polyester acrylate, uretane acrylate, opoxy acrylate and the like with such an electromagnetic radiation as ultraviolet rays, electron rays or the like.

In case of using such a resin, a resin of 1.4 to 1.6 or so in refractive index is usually used. In addition to such resins, glass, ceramic and the like which are transparent may be used.

Such a coating layer 18 containing the spherical beads 20 as described above is formed by applying a coating material obtained by dispersing the spherical beads 20 in a transparent binder to a sheet by means of spray coating, roll coating or the like and making at least part of the spherical beads 20 project from the surface of the coated film.

In this case, as shown in FIG. 3(A), the spherical beads 20 are submerged under the surface of the coating layer just formed by applying a coating material having the spherical beads 20 dispersed in a transparent binder to a sheet, but part of the spherical beads 20 are projected from the surface of the coating layer 18 as the coated film is dried and contracted.

Hereupon, as a material for the spherical beads 20, beads of 1 to 10 μm in diameter are used, said beads being formed out of methyl polymethacrylate (acryl) system, butyl polymethacrylate system, polycarbonate system, polyuretane system, calcium carbonate system, silica system and the like. The diameter of the spherical beads 20 means the average diameter of particles of 1 μm or more.

As a binder resin for forming said coating layer 18, such a transparent material as acryl, polystyrene, polyester, vinyl polymer or the like is used, and the ratio of the refractive index of a material for the spherical beads 20 to the refractive index of a binder resin is preferably in a range from 0.9 to 1.1, and furthermore the density of light-transmissive fine particles is preferably 2 to 15% of the binder resin.

A range of said refractive index ratio of 0.9 to 1.1 is determined by the reason that a refractive index ratio out of said range deteriorates remarkably the primary function of an optical sheet having a prism surface, said function collecting a surface light-source light inputted through the surface of the coating layer 18 in a particular direction, for example, the normal direction to the light outputting surface to improve the brightness.

The thickness of said coating layer 18 is preferably in a range from 1 to 20 μm except the projection height of the spherical beads 20.

The reason is that a coating layer 18 being less than 1 μm in thickness makes it impossible to fix the spherical beads 20 on the reverse surface of the transparent base sheet 12, and the coating layer 18 being 20 μm or more in thickness is reduced in optical transmissivity and deteriorates remarkably the primary function of an optical sheet having a prism surface for improving the brightness.

As for a method for manufacturing said optical sheet 10, an optical sheet of a single-layer structure (an intermediate sheet before coating) can be manufactured by a thermal press method of thermoplastic resins, an injection molding method, a mold-casting method of ultraviolet-setting or thermosetting resins as disclosed in a Japanese laid-open publication Tokkaisho No. 56-157310, for example.

And a another method for manufacturing such an intermediate sheet as described above, there is a method which, as disclosed in a Japanese laid-open publication Tokkaihei No. 5-1699015 for example, fills an intaglio roll having hollow parts (exactly, concave and convex parts) in the reverse shape to the shape of a desired lens array with an ionizing-radiation setting resin liquid, puts a transparent base sheet 12 on this roll, irradiates the transparent base sheet with an ionizing radiation such as ultraviolet rays, electron rays and the like as they are to harden the ionizing-radiation setting resin liquid, and then exfoliates the transparent base sheet together with the hardened ionizing-radiation setting resin from the intaglio roll and thereby forms a lens array in a desired shape on the transparent base sheet by hardening the ionizing-radiation setting resin liquid. Hereupon, the total thickness of said optical sheet 10 is usually about 20 to 1000 μm.

Figure 4A:
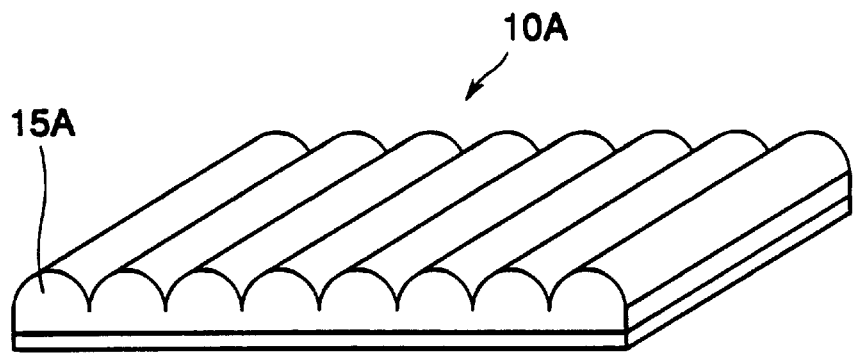
FIGS. 4a and 4c are perspective views showing a second and a fourth example of embodiment of a prism surface or a lens surface of the optical sheet.
Figure 4B:
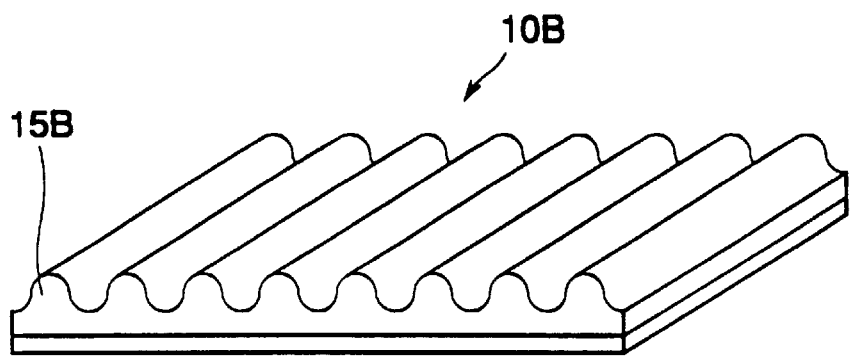
Figure 4C:
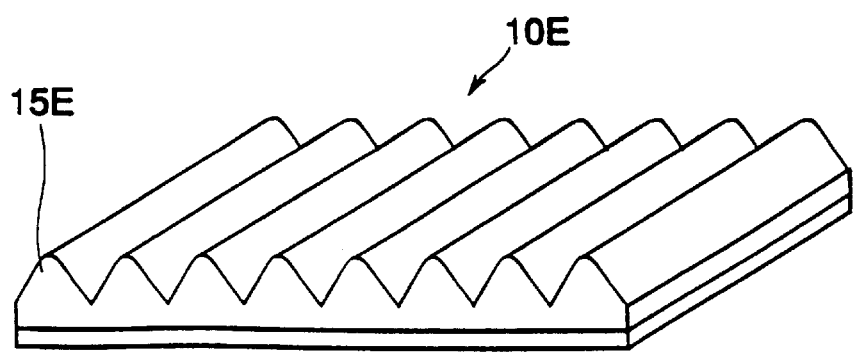
Figure 5A:
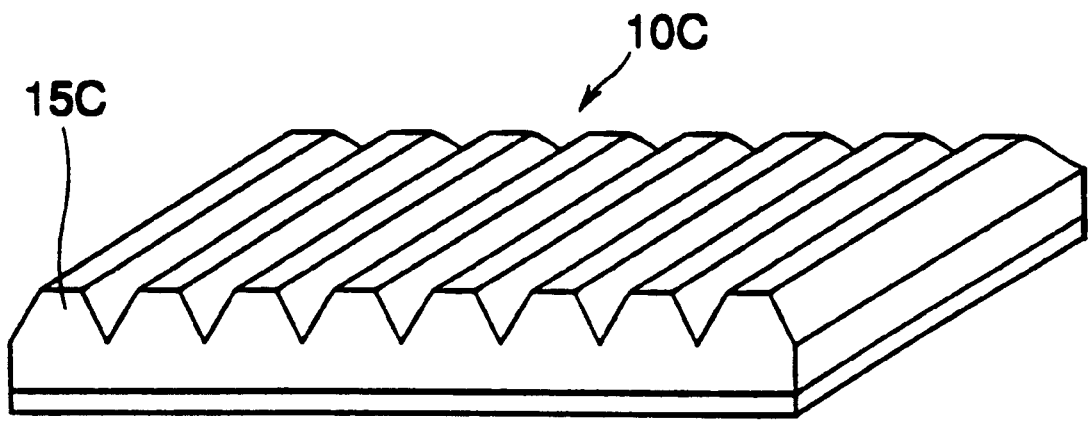
FIGS. 5a and 5b are perspective views showing a fifth and a sixth example of the same.

In the above-mentioned optical sheet 10, although the prism surface 16 is formed by arranging plural unit prisms 14 each of which is in the shape of a triangular prism in parallel with one another, the present invention is not limited to this but can do with an optical sheet having pillar-shaped unit prisms arranged adjacently to one another so that the axes of them are in parallel with one another in a one-dimensional direction, like an optical sheet 10A provided with unit prisms 15A each of which is in the shape of a semicircular cylinder as shown in FIG. 4(A), an optical sheet 10B provided with unit prisms 15B which show a sine curve in cross-sectional view as shown in FIG. 4(B), an optical sheet 10E provided with unit prisms 15E which show a sine curve and a V shape in cross-sectional view, respectively, in the upper half part (mount part) and the lower half part (valley part) as shown in FIG. 4(C), and an optical sheet 10C provided with unit prisms 15C in the shape of trapezoids as shown in FIG. 5(A).

The section of a unit prism is not limited to the shape of a semicircle or a sine curve, but may be in the shape of a chaoid, a Rankine's ovoid, a cycloid, an involute, and a polygon other than a triangle.

Figure 5B:
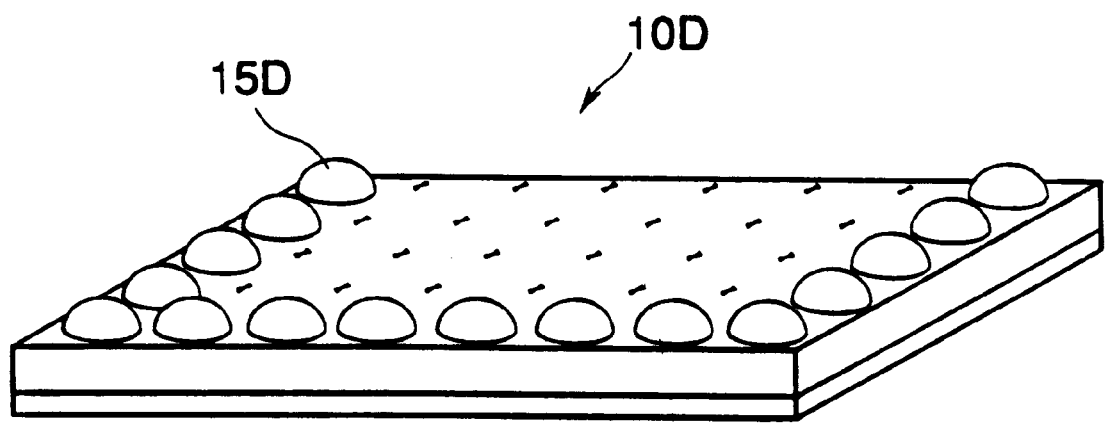

And as shown in FIG. 5(B), said optical sheet may be an optical sheet 10D provided with a so-called compound-eye (fly-eye) lens and the like where unit prisms 15D each of which is a semisphere and independently projected are arranged in two-dimensional directions. The unit prism may be in the shape of a pyramid.

Figure 6:
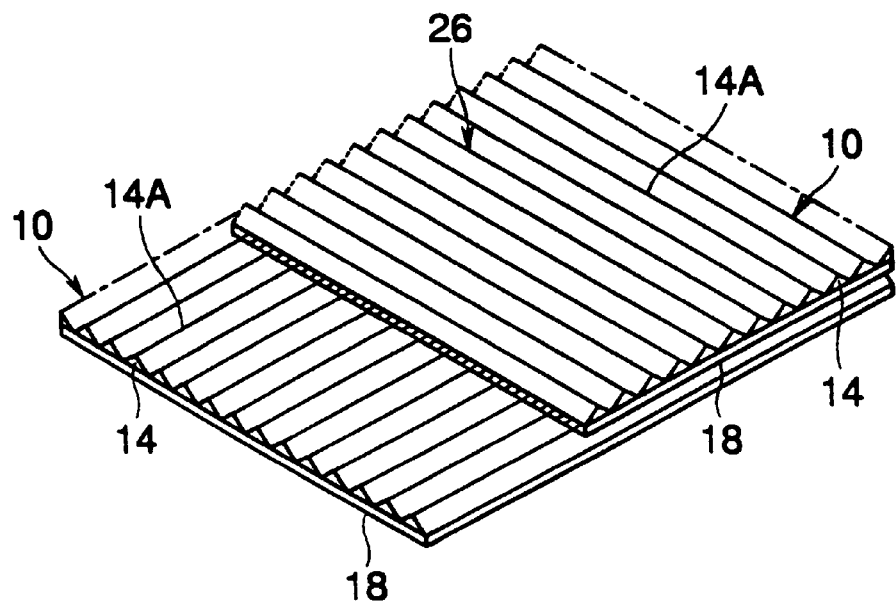
FIG. 6 is a perspective view showing a first example of embodiment of an optical sheet lamination.
Figure 7:
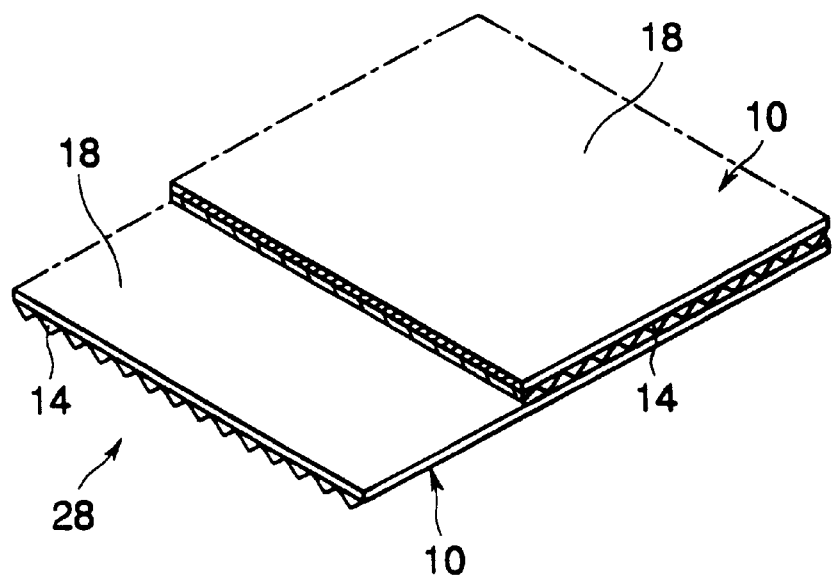
FIG. 7 is a perspective view showing a second example of the same embodiment.

Furthermore, an optical sheet of the invention may be improved in directivity of its output light by being used as a sheet lamination obtained by laminating plural sheets on one another as shown in FIG. 6 or 7.

An optical sheet lamination 26 shown in FIG. 6 is obtained by laminating two optical sheets 10 on each other, where the upper optical sheet 10 and the lower optical sheet 10 are disposed so that the coating layer 18 on the lower surface of the upper optical sheet 10 comes into contact with the prism surface 16 of the upper surface of the lower optical sheet 10. That is to say, the ridge-line 14A of each unit prism 14 of the lower optical sheet 10 is in contact with the coating layer 18 of the upper optical sheet 10.

The upper and lower optical sheets 10 are arranged so that the ridge-lines 14A of the unit prisms 14 of the upper optical sheet and those of the lower optical sheet are perpendicular to each other in a plan view of them.

In an optical sheet lamination 28 of FIG. 7, two optical sheets 10 are arranged so that both of the prism surfaces 16 of them are brought to the light receiving side by putting upside down each of the two optical sheets reversely to FIG. 6.

A second embodiment of the invention is described in detail with reference to the drawings in the following. In the second embodiment, the same parts as said optical sheet shown in FIGS. 1 and 2 are given the same symbols and description for them is omitted.

Figure 8:
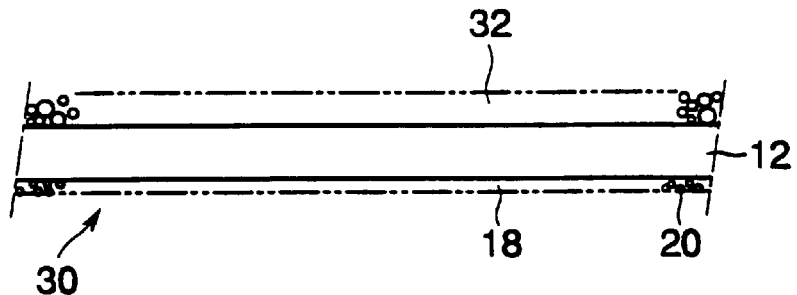
FIG. 8 is a sectional view magnifying part of an optical sheet as a light diffusing sheet according to the second example of embodiment of the present invention.
Figure 9:
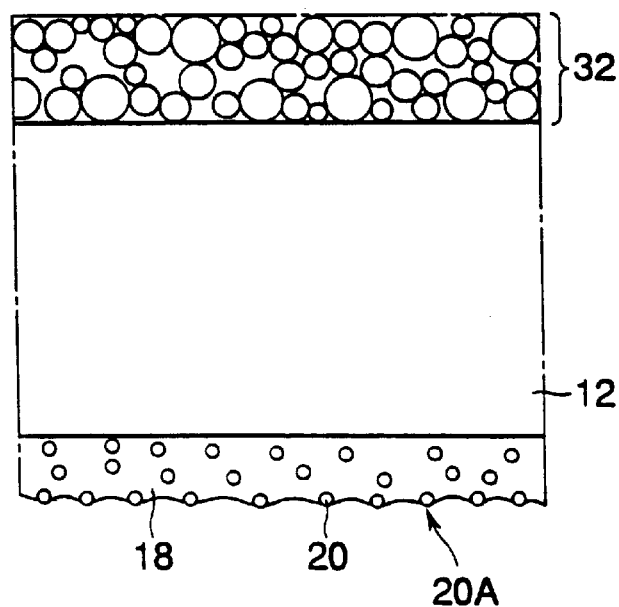
FIG. 9 is a sectional view showing a process of forming a coating layer of the same optical sheet.

As shown in FIGS. 8 and 9, an optical sheet 30 according to the second example of embodiment of the invention is provided with a transparent base sheet 12, wherein one surface (the upper surface in FIGS. 8 and 9) of it is provided with a light diffusing layer 32 and the other surface opposite to this light diffusing layer 32 is provided with a coating layer 18, and spherical beads 20, formed out of a light-transmissive material, being 1 to 10 μm in particle diameter and 1 μm or less in half bandwidth of the distribution of particle diameters are contained in this coating layer 18.

The spherical beads 20 are distributed two-dimensionally at random on the surface of said coating layer 18.

Figure 10:
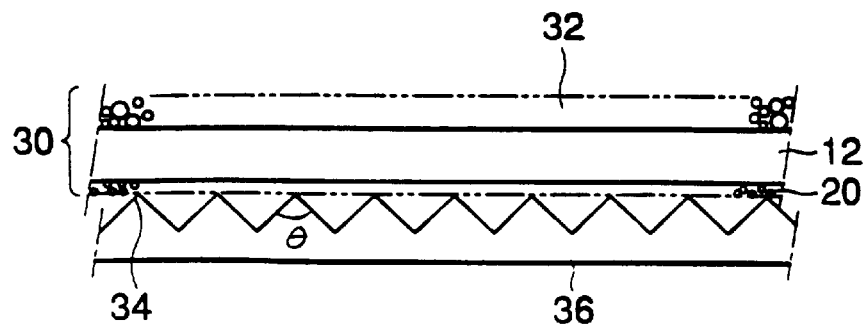
FIG. 10 is a perspective view showing a first example of embodiment of an optical sheet lamination using the same optical sheet.

In case of disposing said optical sheet 30 so that its coating layer 18 side comes into contact with another light-transmissive material, for example, into contact with the prism surface of a prism sheet 36 having unit prisms 34 in the shape of a triangular prism as shown in FIG. 10, in the prior art as described above, a problem has appeared that a prism part (or lens part) being in contact with a light diffusing sheet is damaged by a rugged portion on the surface of the light diffusing sheet and thereby a uniform surface light emitting state as a whole is deteriorated, but since the spherical beads 20 are 1 μm or less in half bandwidth of the distribution of particle diameters as described above, variation in height of the spherical beads 20 projecting from the surface of the coating layer 18 becomes 1 μm or less. Therefore, since said spherical beads 20 come uniformly in contact with the tops of the prism parts on another prism sheet or the flat and smooth surface of another light-transmissive material, a concentrated load caused by contact with a spherical bead greatly projected is not generated and a prism part or the like of, the prism sheet is prevented from damage, even if the vertical angle θ of the tops of the prisms 34 on another prism sheet 36 is as sharp as 100° or less.

The light diffusing layer 32 of said optical sheet 30 is enough if it has a function of diffusing light, and is formed out of a coating layer of a light-transmissive material, for example, having light-transmissive spherical beads of 1 to 30 μm in particular diameter.

In this case, in order to increase an effect of improving the brightness in the normal direction to the sheet as a light diffusing sheet, the average particle diameter of the light-transmissive spherical beads 20 in the light diffusing layer 32 needs to be made greater than the average particle diameter of the light-transmissive spherical beads 20 in the coating layer 18.

Hereupon, although the half bandwidth of the distribution of particle diameters of the light-transmissive spherical beads in said light diffusing layer 32 is not limited in particular, in case that another optical material coming in contact with this light diffusing layer 32 is damageable, said half bandwidth is preferably 1 μm or less in the same way as the half bandwidth of the light-transmissive spherical beads in said coating layer 18.

Since said transparent base sheet 12, a coating layer 18, a material for spherical beads 20, characteristics of them and the like are the same as the first example of said embodiment, description of them is omitted.

Although said optical sheet 30 is laminated on a prism sheet 36 having unit prisms 34 each of which is in the shape of a triangular prism as shown in FIG. 10, the present invention is not limited to this but can do with a prism sheet in another shape, for example, a prism sheet provided with unit prisms as shown in FIGS. 4 and 5.

And said prism sheet may be formed into a lamination having plural sheets put on one another as shown in FIGS. 6 and 7 to improve the directivity of its output light. In this case, the upper and lower prism sheets are preferably arranged so that the ridge-lines of the unit prisms of the upper optical sheet and those of the lower optical sheet are perpendicular to each other in a plan view of them.

And it is a matter of course that this optical sheet 30 can be used not only in case of being laminated on a prism sheet but also in case of being laminated on an optical material whose surface is damageable.

A third example of embodiment of the present invention is described in detail with reference to the drawings in the following.

Figure 11:
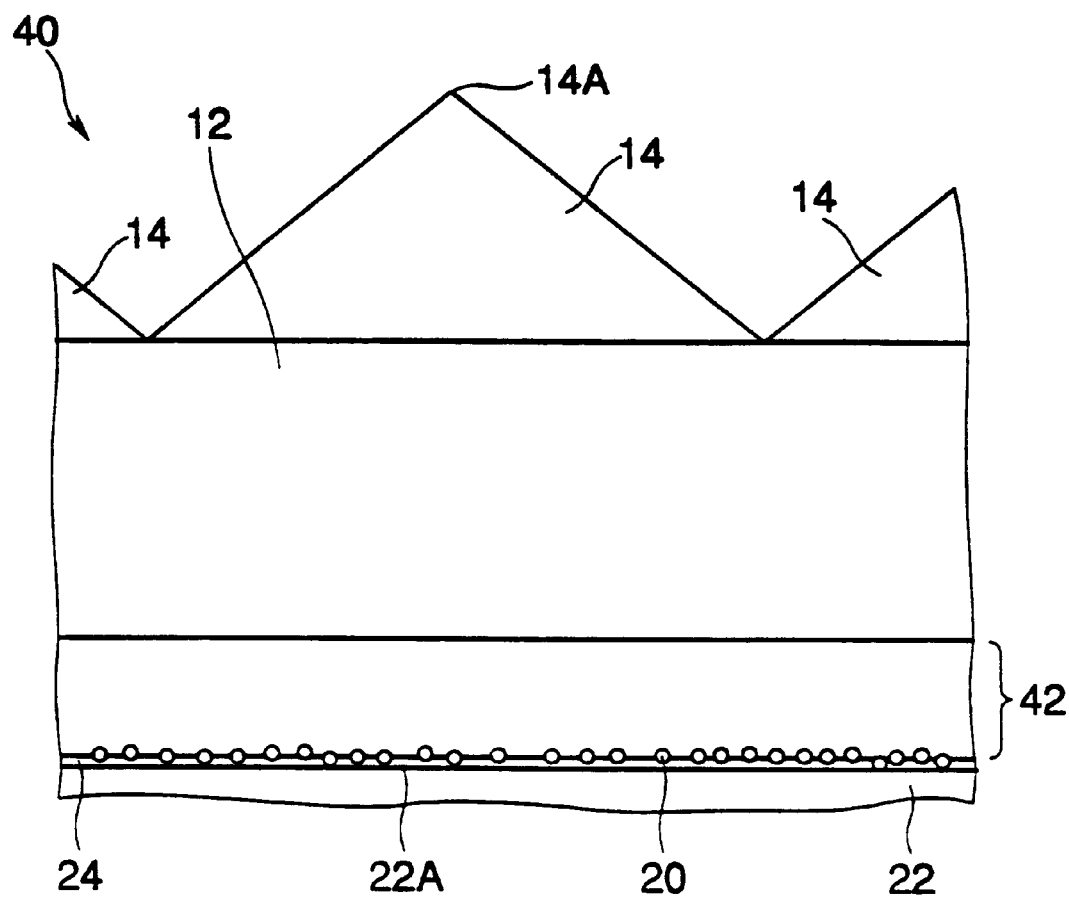
FIG. 11 is a sectional view magnifying part of an optical sheet according to a third example of embodiment of the present invention.

As shown in FIG. 11, an optical sheet 40 according to the invention is nearly the same as the optical sheet of FIGS. 1 and 2, but is different from it in that the light-transmissive beads 20 are distributed unevenly more on the surface of a coating layer 42.

Said coating layer 18 is formed by applying a coating material (ink) obtained by dispersing the light-transmissive beads 20 in a light-transmissive resin (binder) to a sheet by means of spray coating, roll coating or the like and making at least part of the light-transmissive beads 20 project from the surface of the coated film of the coating layer 42 to form fine knoll-shaped projections.

The light-transmissive beads 20 forming part of said coating material (ink) are selected so that its specific gravity is smaller than the specific gravity of said light-transmissive resin to be formed into a binder.

Said coating material is applied so that the coated film is pressed by gravity to the reverse surface of the transparent sheet 12. For example, as shown in FIG. 12, said coating material is applied to the upper surface of the transparent base sheet 12 in a state where the reverse surface of it faces upward, reversely to the state of FIG. 11.

Figure 12A:
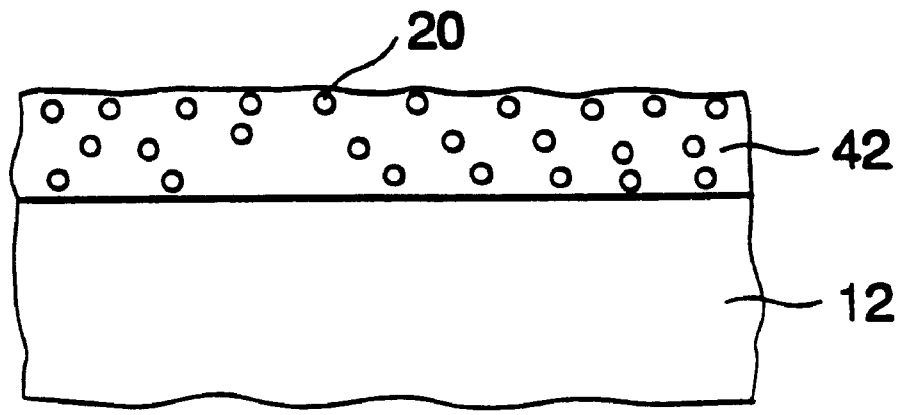
FIGS. 12a and 12b are sectional views showing a process of forming a coating layer of the same optical sheet.
Figure 12B:
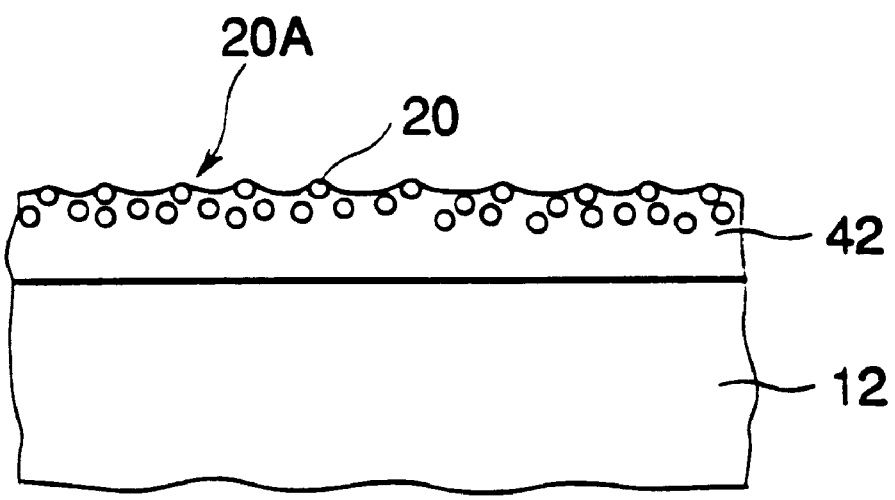

When the coating material has been applied in such a way, the light-transmissive beads are distributed in the coated film in a liquid state uniformly in the direction of its thickness as shown in FIG. 12(A), but with the lapse of time (after 3 to 60 seconds) the light-transmissive beads come up thanks to a specific gravity difference and come together (are distributed unevenly) to the surface of the coating layer 42 as shown in FIG. 12(B) and part of them project from the surface to be formed into fine knoll-shaped projections.

In this state the coating layer 42 is successfully hardened by a hardening means such as ultraviolet rays, electron rays, radioactive rays or the like suitable for the light-transmissive resin.

Even in case that the ink is a thermosetting ink containing a great amount of such a solvent smaller in specific gravity than the light-transmissive beads as toluene, methyl-ethyl ketone (MEK) or the like, it is an essential condition of the present invention that the light-transmissive beads are smaller in specific gravity than a light-transmissive resin (binder) including the solvent to volatilize at the time of drying.

In case of a thermosetting ink, a mixture of liquid substances (a transmissive resin+a solvent) other than the light-transmissive beads 20 is often smaller in specific gravity than the light-transmissive beads 20; and in such a case, immediately after the coating layer 42 has been just formed by applying the ink to the opposite surface of the light-transmissive base sheet to the gravity, the light-transmissive beads 20 are uniformly distributed in the light-transmissive resin (binder), as shown in FIG. 12(A), and since the solvent volatilizes in a drying process after a coating process, namely, since a solvent component of said mixture (transmissive resin+solvent) volatilizes with the lapse of time (usually 3 to 300 seconds), thanks to a fact that the specific gravity of the light-transmissive beads 20 is smaller than the specific gravity of the light-transmissive resin, part of light-transmissive beads 20 are projected from the surface of the coating layer 18 and thereby fine knoll-shaped projections are formed, as shown in FIG. 12(B).

Next, a surface light source device 50 according to an embodiment of the present invention is described with reference to FIG. 13 in the following.

Figure 13:
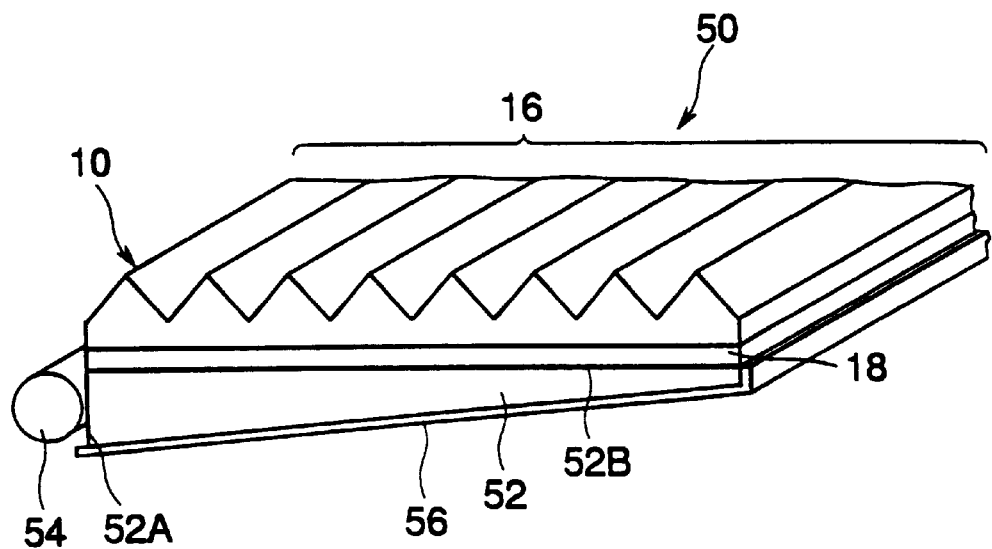
FIG. 13 is a perspective view showing the main part of a surface light source device using an optical sheet having a prism surface according to embodiment of the invention.

The surface light source device 50 is provided with the optical sheet 10 shown in FIG. 1 at the light outputting surface side, and comprises a light guidee means 52 which is in the shape of a plate formed out of a light-transmissive material and outputs a light introduced through the left side end surface 52A, as shown in FIG. 13, from the light outputting surface 52B at the upper side, a linear light source 54 which is disposed along and in parallel with said side end surface 52A of the light guide means 52 and inputs a light through said side end surface 52A into said light guide means 52, and an optical reflector plate 56 which is disposed so as to cover the opposite surface of said light guide means 52 to the light outputting surface 52B and the other side end surfaces than the left side end surface 52A, and reflects and returns lights outputted from these surfaces into the light guide means 52.

The coating layer 18 of said optical sheet 10 is disposed as being in contact with the light outputting surface 52B of said light guide means 52. Said light guide means 52 is usually accommodated in an enclosure (not illustrated) having the light outputting surface 52B as a window.

A material for said light guide means 52 is selected from light-transmissive materials similar to said optical sheet 10, and usually an acryl or carbonate resin is used. Said light guide means 52 is usually about 1 to 10 mm in thickness, and is tapered so that it is thickest at the position of the side end surface 52A at the said linear light source 54 side and becomes gradually thinner toward the opposite direction from this position.

This light guide means 52 is additionally provided with a light diffusing function inside or on the surface of it in order to output light from the wide surface (light outputting surface 52B). Said linear light source 54 is preferably a fluorescent lamp in a viewpoint of giving a uniform brightness on the light outputting surface 52B.

In this surface light source device 50, the light source for inputting light into the light guide 52 is not limited to a linear light source but may be a light source where such point light sources as incandescent light bulbs, light emitting diodes and the like are arranged in a line. And a plurality of small-sized flat fluorescent lamps may be arranged along the side end surface 52A.

In the surface light source device 50 shown in FIG. 13, since the optical sheet 10 is brought into contact with the light outputting surface 52B of the light guide means 52 through the spherical beads projecting from the coating layer 18 and being put between them, it is prevented that interference fringes are generated between the surface of the coating layer 18 and the light outputting surface 52B. Accordingly, it is possible to form a good light emitting surface as a surface light source for a light-transmissive type liquid crystal display apparatus or the like. And the spherical beads 20 hardly damage the light outputting surface 52B of the light guide means 52.

For example, the light guide means 52 may be in the shape of a plate uniform in thickness and be provided with a linear light source also at the side end surface side opposite to said side end surface 52A so as to introduce light also from here. By doing so, it is possible to make the prism surface 16 more bright and improve in uniformity a brightness distribution on said prism surface 16.

Next, a direct back light type surface light source device 60 is described with reference to FIG. 14.

This surface light source device 60 has a light diffusing sheet 62 disposed along the coating layer 18 on the reverse side of the optical sheet 10 shown in FIG. 1, and outputs through said light diffusing sheet 62 a light inputted from the light source 54 directly and after making the light reflect from a concave reflector plate 64.

In the surface light source device 60 also, in the same manner as said surface light source device 50, since the distance between the surface of the coating layer 18 of the optical sheet 10 and the light diffusing sheet 62 is controlled to 1 to 10 μm by the spherical beads 20, no interference fringes are generated between them. And the spherical beads 20 hardly damage the light diffusing sheet 62.

A thin metal sheet deposited with aluminum or the like, or a white foaming polyethylene terephtalate (PET) or the like is used for said optical reflector plates 56 and 64.

A shape capable of uniformly making the light reflect from the linear light source 54 as parallel rays is enough as the shape of the optical reflector plate 64 in the direct back light type surface light source device 60, and a concave circular arc, a paraboloidal cylinder, a hyperboloidal cylinder, an ellipsoidal cylinder or the like is selected.

Figure 15:
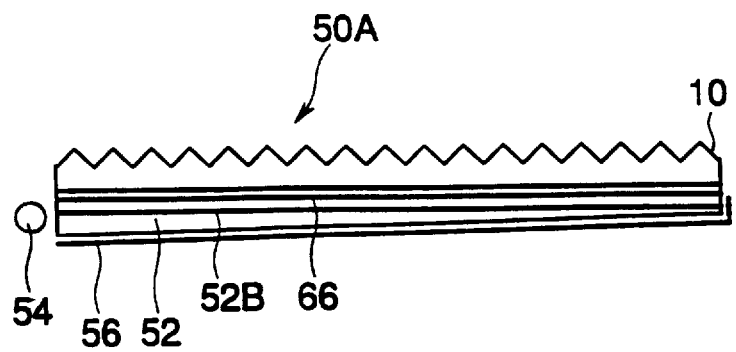
FIG. 15 is a sectional view roughly showing a third example of embodiment of the same surface light source device.

Although the coating layer 18 of the optical sheet 10 is disposed directly on the light outputting surface 52B of the light guide means 52 in said surface light source device 50, the present invention is not limited to this but a light diffusing sheet 66 may be disposed between the optical sheet 10 and the light outputting surface 52B in a similar manner to the surface light source device 50A shown in FIG. 15.

Figure 16:
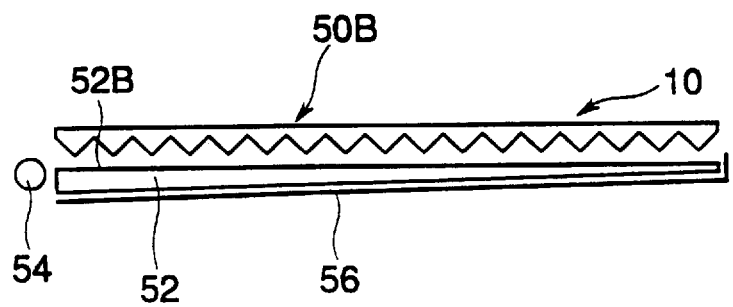
FIG. 16 is a sectional view roughly showing a fourth example of the same embodiment.
Figure 17:
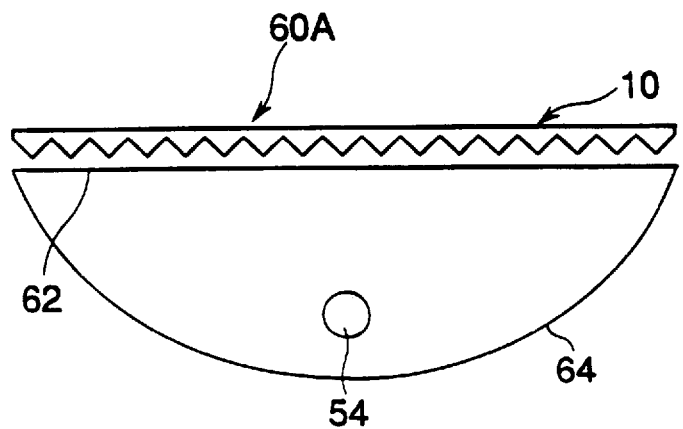
FIG. 17 is a sectional view roughly showing a fifth example of the same embodiment.

Although each of the coating layers 18 in said optical sheets is disposed so as to face the light input side, it may be disposed so that the unit prism 14 side faces the light outputting surface 52B side of the light guide means 52 or the optical reflector plate 64 side in a similar manner to surface light source devices 50B and 60A shown in FIGS. 16 and 17.

Although each of said surface light source devices 50, 50A, 50B, 60 and 60A uses a single optical sheet 10, the present invention is not limited to this but may use a lamination of two, three or more optical sheets as shown in FIGS. 18 to 21. Even in case of using a lamination of plural optical sheets in such a way, since variation in height of the spherical beads 20 projecting from the reverse surface of an optical sheet is a little, no concentrated load damages unit prisms of another optical sheet.

Figure 18:
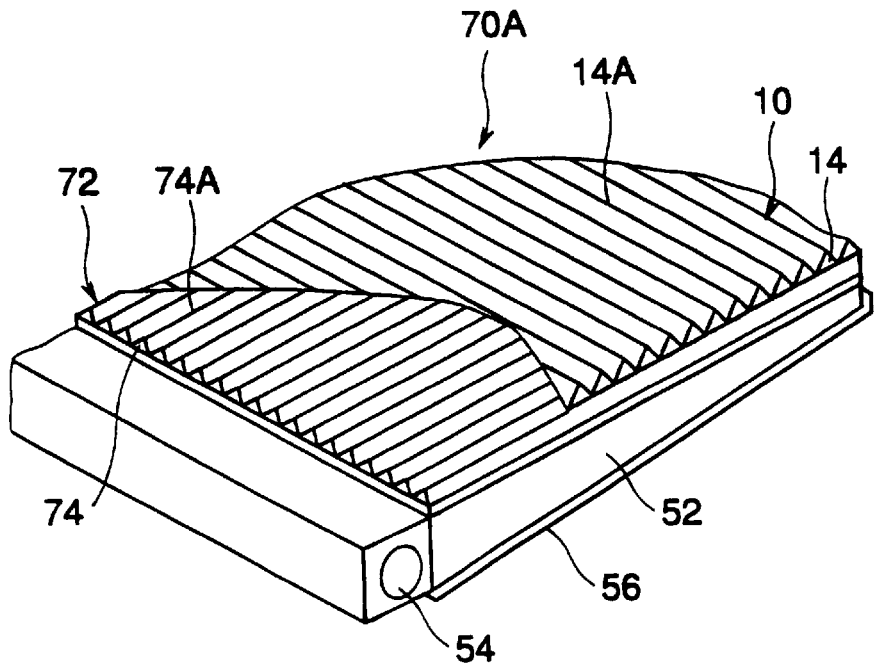
FIG. 18 is a perspective view showing the main part of a sixth example of the same embodiment.

A surface light source device 70A of FIG. 18 is obtained by disposing a second optical sheet 72 between the light outputting surface 52B of the light guide means 52 and the optical sheet 10 in the surface light source device 50 shown in FIG. 13.

The second optical sheet 72 has basically the same composition as said optical sheet 10, but its coating layer side is not provided with spherical beads and is formed into a flat and smooth surface similarly to the prior art.

The ridge-lines 74A of unit prisms 74 in the second optical sheet 72 are arranged perpendicularly to the ridge-lines 14A of the unit prisms 14 in said optical sheet 10.

In case of the surface light source device 70A, interference fringes are generated between the flat and smooth surface opposite to the prism surface of the second optical sheet 72 and the light outputting surface 52B of the light guide means 52, but thanks to covering the upper side of the second optical sheet 72 with the optical sheet 10, the interference fringes could not be observed.

Figure 14:
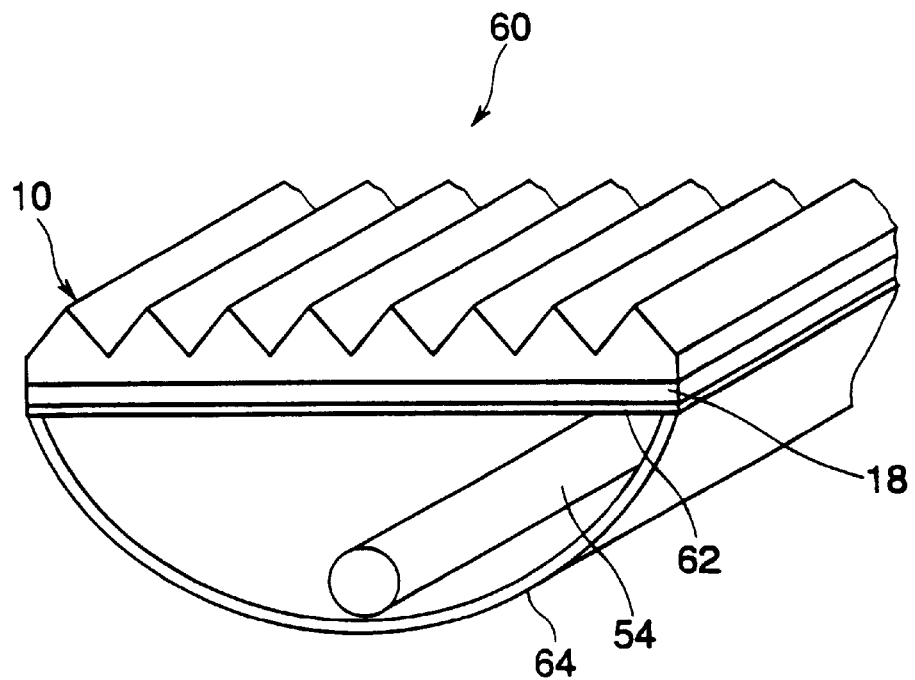
FIG. 14 is a perspective view showing a second example of embodiment of the same surface light source device.
Figure 19:
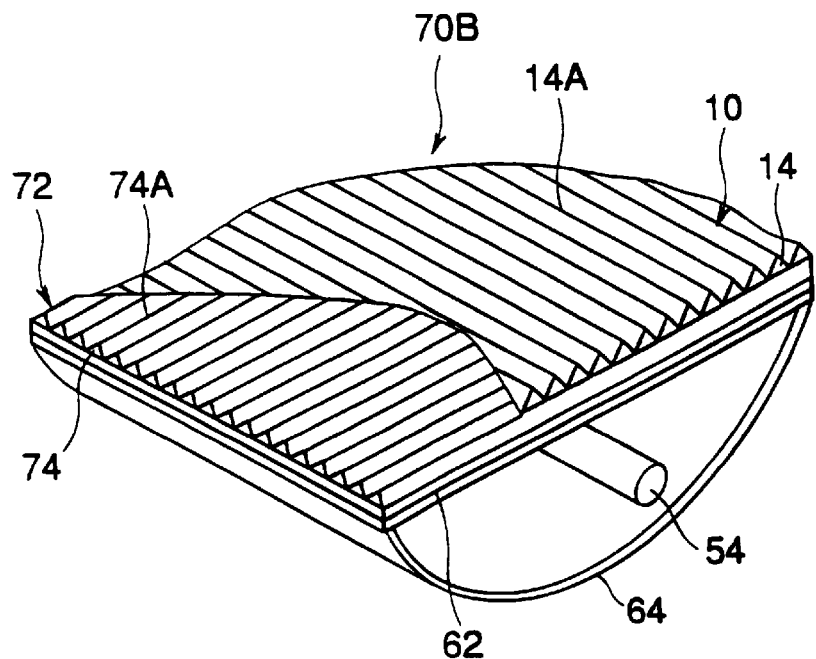
FIG. 19 is a perspective view showing the main part of a seventh example of the same embodiment.

A surface light source device 70B shown in FIG. 19 has been formed out of the composition of FIG. 18 into a direct back light type, and description of it is omitted by giving the same symbols to the same components as FIGS. 14 and 18.

Figure 20:
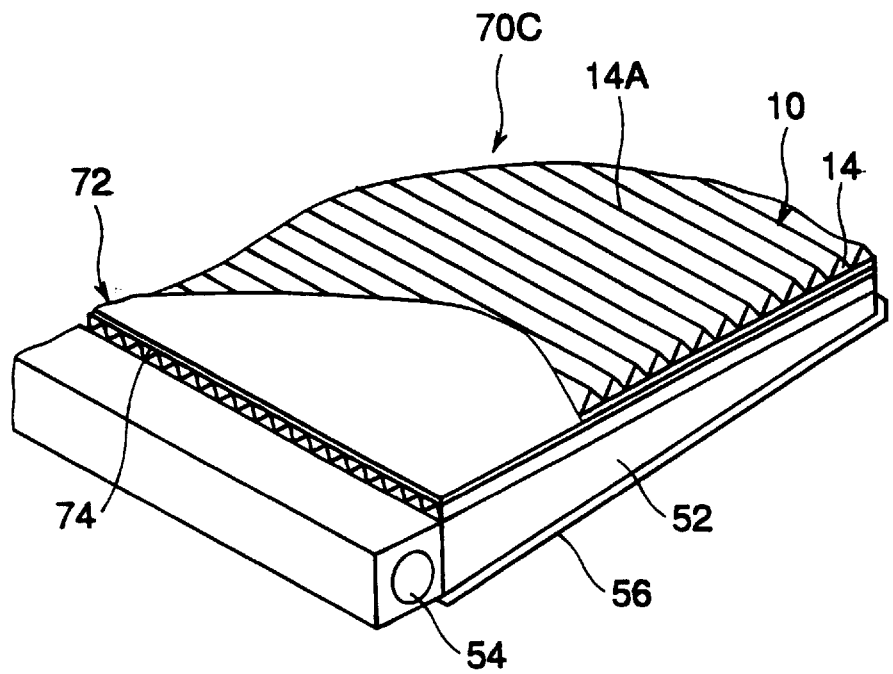
FIG. 20 is a perspective view showing the main part of an eighth example of the same embodiment.
Figure 21:
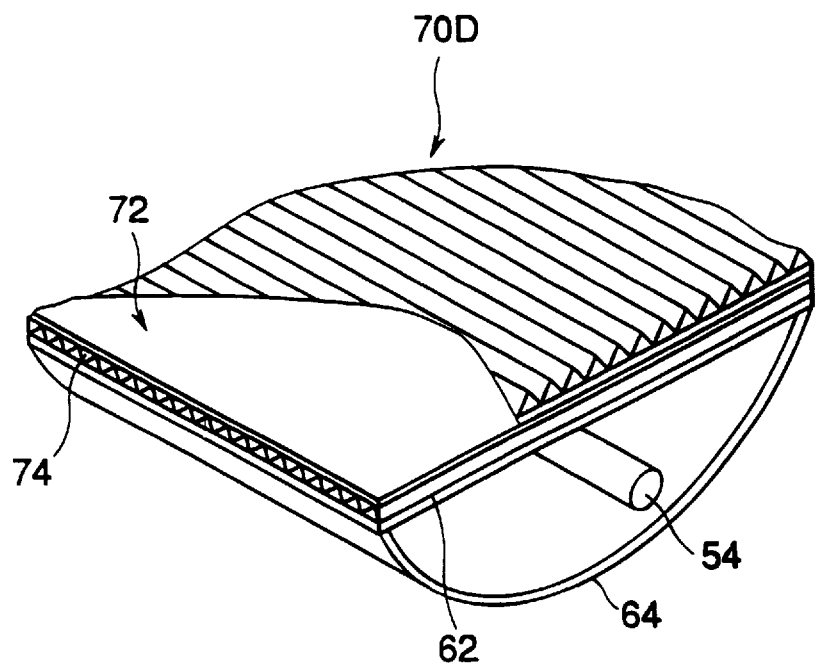
FIG. 21 is a perspective view showing the main part of a ninth example of the same embodiment.

In such surface light source devices 70A and 70B each having a lamination of two prism sheets as described above, the second prism sheet 72 is disposed so that its unit prisms 74 face the light outputting surface side, but the present invention is not limited to this but the unit prisms 74 of the second optical sheet 72 may face the light guide means 52 side or the light diffusing sheet 66 side, similarly to surface light source devices 70C and 70D shown in FIGS. 20 and 21 for example.

In FIGS. 20 and 21, description of them is omitted by giving the same symbols to the same components as FIGS. 18 and 19.

Figure 22:
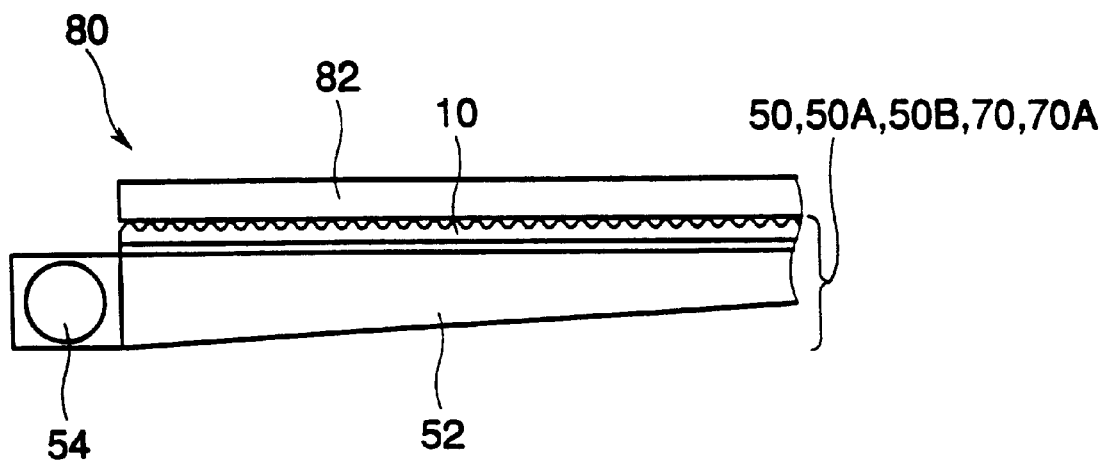
FIG. 22 is a side view roughly showing a liquid crystal display apparatus according to an embodiment of the invention.

Next, a liquid crystal display apparatus 80 according to an embodiment of the present invention as shown in FIG. 22 is described.

The liquid crystal display apparatus 80 is formed by arranging a liquid crystal panel 82 at the light outputting surface side of the surface light source device 50, 50A, 50B, 70 or 70A as shown in FIG. 13, 15, 16, 18 or 20.

This liquid crystal display apparatus is of a light-transmissive type, and each of pixels forming its liquid crystal screen is illuminated from the back side with the output light from said surface light source device.

In this liquid crystal display apparatus 80, as described above, since no interference fringes appear in the illuminating light from the surface light source device, a good image can be formed. And since the distance between the coating layer 18 of the optical sheet 10 and the flat and smooth surface of the light guide means 52, the light diffusing sheet or another optical sheet is 10 μm or less as described above, a light collecting performance, for example, in the normal direction to the optical sheet 10 is not deteriorated and therefore a good brightness can be obtained.

Next, a surface light source device 90 according to an embodiment of the present invention is described with reference to FIG. 23.

Figure 23:
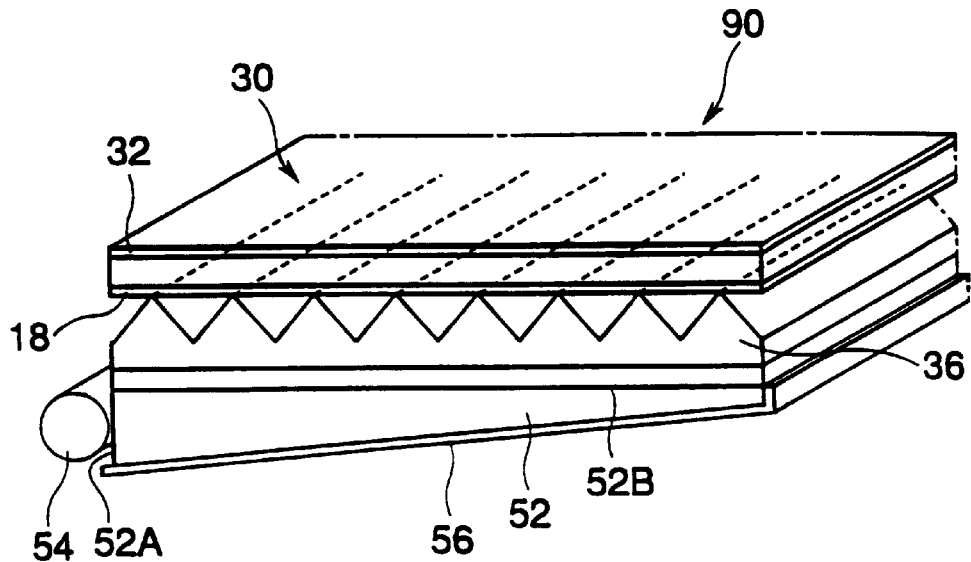
FIG. 23 is a perspective view showing the main part of a surface light source device according to an embodiment using an optical sheet which is a light diffusing sheet of the present invention.

This surface light source device 90 is provided with the optical sheet 30 shown in FIG. 8 bringing its coating layer 18 side into contact with the prism surface of the prism sheet 36 at the light outputting surface side, and comprises a light guide means 52 which is a plate-shaped member made of a light-transmissive material similar to the surface light source device 50 of FIG. 13 and outputs from the upper light outputting surface 52B a light introduced through the left side end surface 52A in FIG. 23, a linear light source 54 which is disposed along and in parallel with said side end surface 52A of this light guide means 52 and inputs a light into said light guide means 52 through said side end surface 52A, and an optical reflector plate 56 which is disposed so as to cover the opposite surface of said light guide means 52 to the light outputting surface 52B and the other side end surfaces than the left side end surface 52A, and reflects and returns lights outputted from these surfaces into the light guide means 52. Said light guide means 52 is usually accommodated in an enclosure (not illustrated) having the light outputting surface 52B as a window.

In the surface light source device 90, as described above, since the spherical beads 20 are 1 μm or less in half bandwidth of the distribution of particle diameters, variation in height of the spherical beads 20 projecting from the surface of the coating layer 18 is 1 μm or less.

Therefore, since the spherical beads 20 uniformly come into contact with the prism tops of the prism sheet 36, a concentrated load caused by contact with a greatly projected spherical bead is not generated and so damage of the prisms of the prism sheet 36 is prevented.

And also in case that there is not the prism sheet 36 in FIG. 23, namely, in case that the coating layer 18 of said optical sheet 30 is in contact with the light outputting surface 52B of said light guide means 52, similarly the light guide means 52 is prevented from being damaged.

The material, shape, light diffusing function and light source of said light guide means 52 are the same as the light guide means of said FIG. 13.

Next, a direct back light type surface light source device 92 is described with reference to FIG. 24. This surface light source device 92 has a prism sheet 36 disposed along the coating layer 18 on the reverse side of the optical sheet 30 shown in FIG. 8 and outputs to said prism sheet 36 a light, which has been inputted from the light source 54, directly and after making the light reflect from a concave reflector plate 64.

In the surface light source device 92 also, the spherical beads 20 of the coating layer 18 of the optical sheet 30 hardly damage the prism surface.

Figure 25:
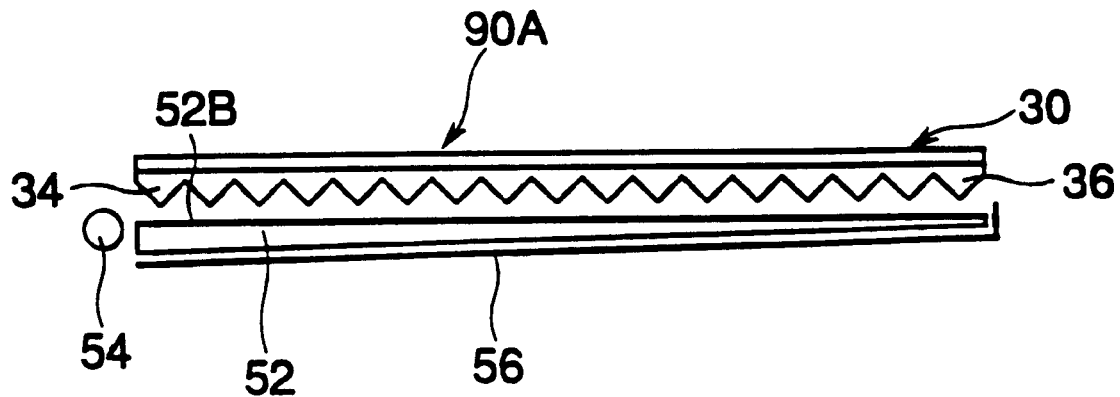
FIG. 25 is a sectional view roughly showing a third example of embodiment of the same surface light source device.
Figure 26:
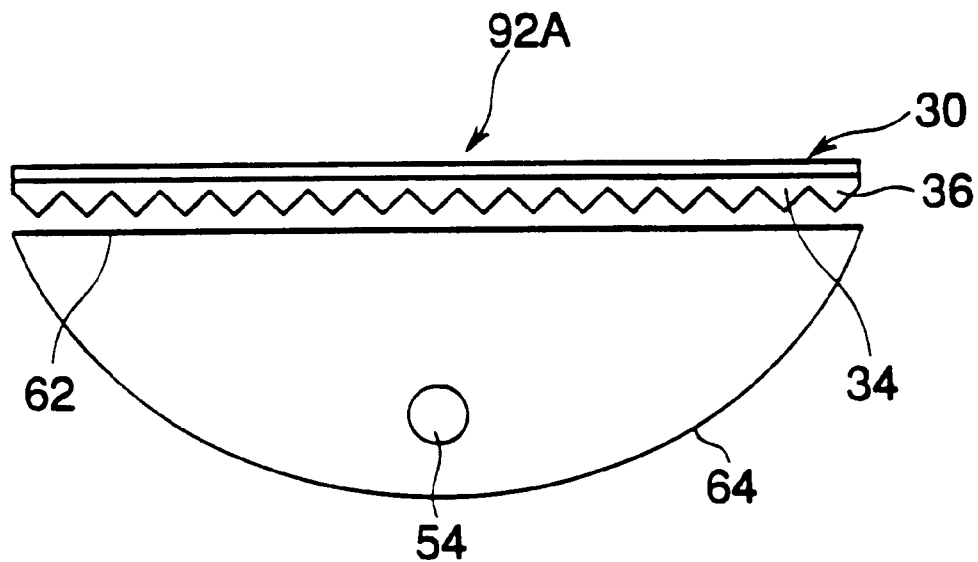
FIG. 26 is a sectional view roughly showing a fourth example of embodiment of the same embodiment.

Although each of said prism sheets 36 is disposed so that its prism surface faces the light outputting side, it may be disposed so that the unit prism 34 side faces the light outputting surface 52B side of the light guide means 52 or the optical reflector plate 64 side in the same way as surface light source devices 90A and 92A shown in FIGS. 25 and 26.

Although each of said surface light source devices 90, 90A, 92 and 92A uses a single prism sheet, the present invention is not limited to this but may use a lamination of two, three or more prism sheets as shown in FIGS. 27 to 30. Even in case of using a lamination of plural prism sheets in such a way, since variation in height of the spherical beads 20 projecting from the reverse surface of a prism sheet is a little, no concentrated load damages unit prisms of another prism sheet.

Figure 27:
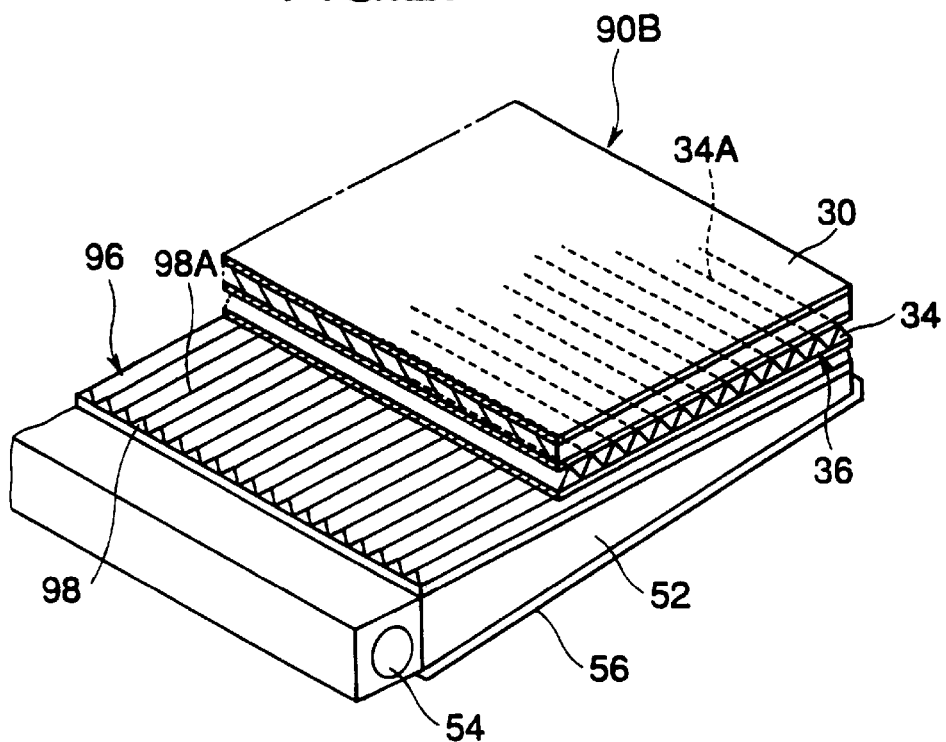
FIG. 27 is a perspective view showing the main part of a fifth example of the same embodiment.

A surface light source device 90B of FIG. 27 is formed by disposing a second optical sheet 96 between the light outputting surface 52B of the light guide means 52 and the optical sheet 30 in the surface light source device 90 shown in FIG. 23.

The second optical sheet 96 has basically the same composition as said optical sheet 30, but may have various unit prisms as shown in FIGS. 4 and 5.

The ridge-lines 98A of unit prisms 98 in the second optical sheet 96 are arranged perpendicularly to the ridge-lines 34A of the unit prisms 34 in said optical sheet 30.

Figure 24:
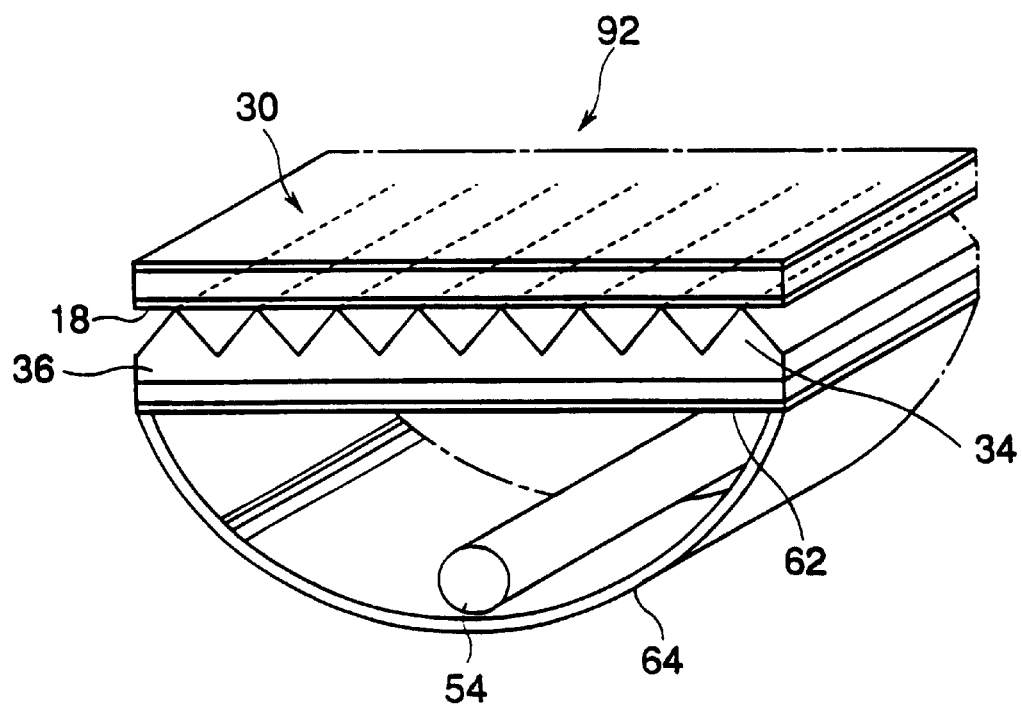
FIG. 24 is a perspective view showing a second example of embodiment of the surface light source device.
Figure 28:
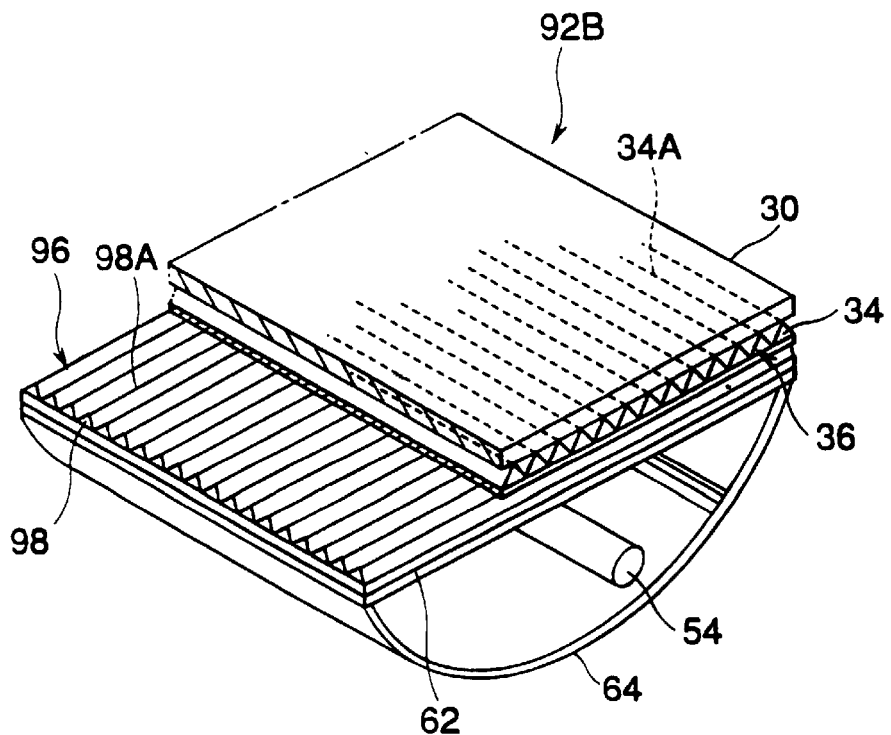
FIG. 28 is a perspective view showing the main part of a sixth example of the same embodiment.

A surface light source device 92B shown in FIG. 28 is formed by forming the composition of FIG. 27 into a direct back light type, and description of it is omitted by giving the same symbols to the same components as FIGS. 27 and 24.

Figure 29:
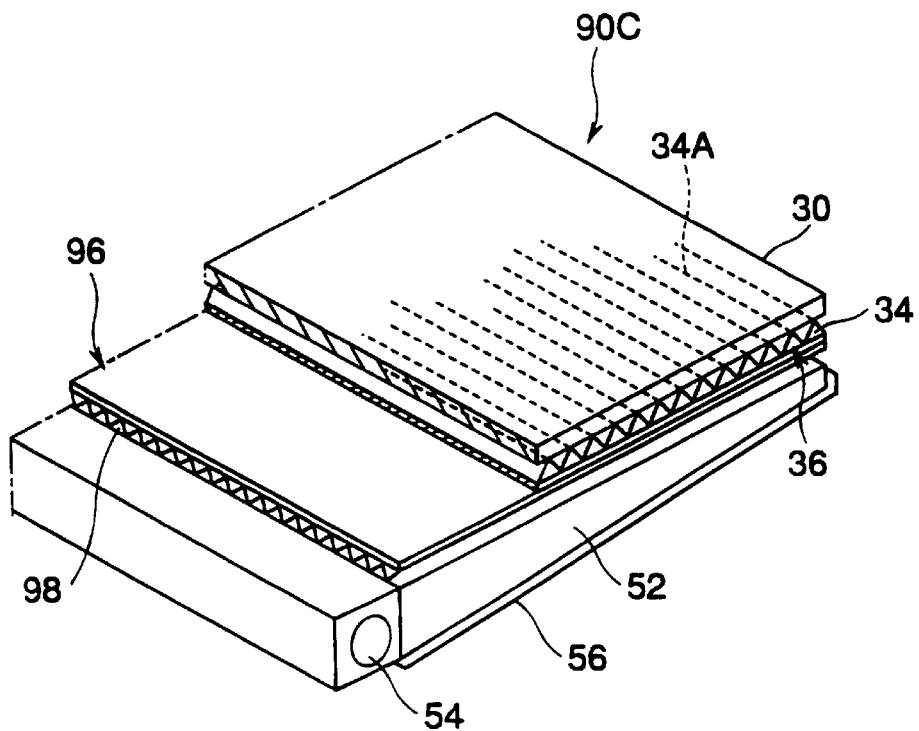
FIG. 29 is a perspective view showing the main part of a seventh example of the same embodiment.
Figure 30:
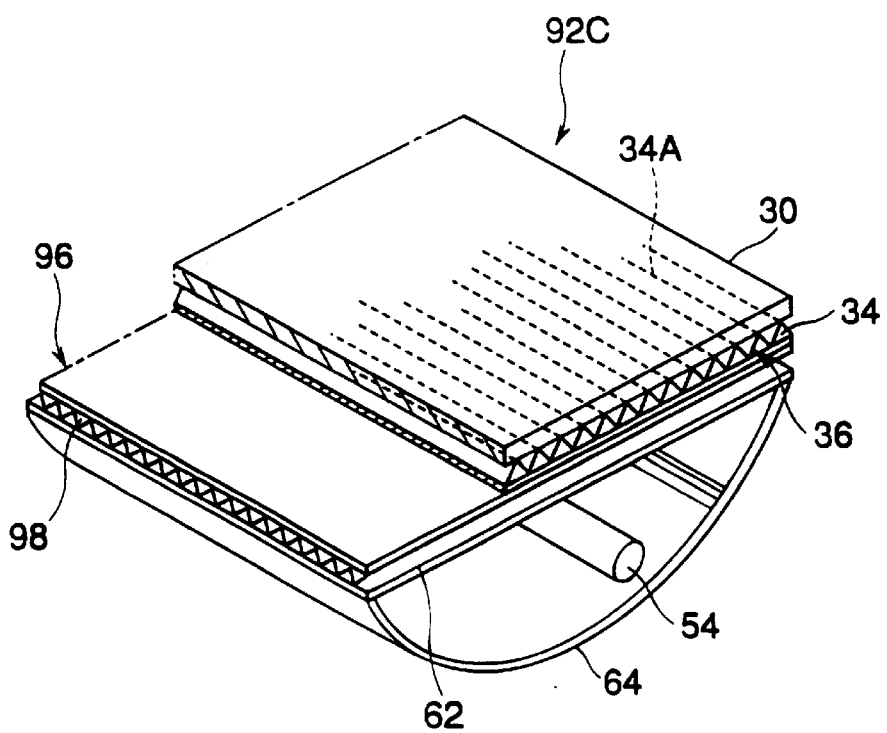
FIG. 30 is a perspective view showing the main part of an eighth example of the same embodiment.

In such surface light source devices 90B and 92B each having a lamination of two prism sheets as described above, the second prism sheet 96 is disposed so that its unit prisms 98 face the light outputting surface side, but the present invention is not limited to this but the unit prisms 98 of the second optical sheet 96 may face the light guide means 52 side or the light diffusing sheet side, similarly to surface light source devices 90C and 92D shown in FIGS. 29 and 30 for example.

In FIGS. 29 and 30, description of them is omitted by giving the same symbols to the same components as FIGS. 27 and 28.

Figure 31:
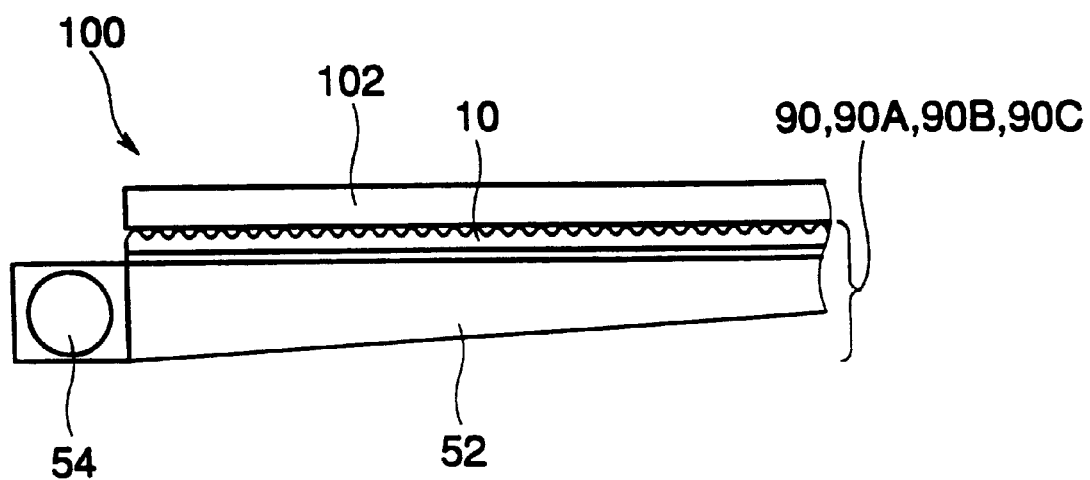
FIG. 31 is a side view roughly showing a liquid crystal display apparatus according to an embodiment of the invention.
Figure 32A:
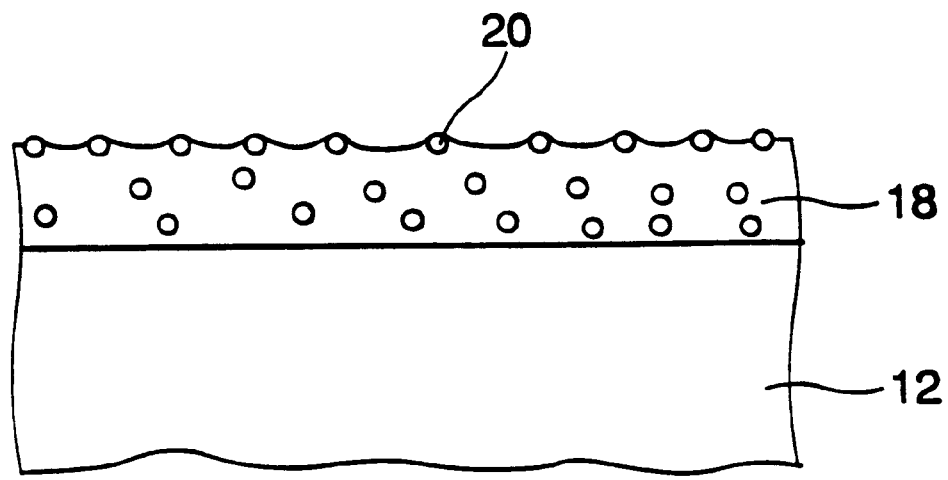
FIGS. 32a and 32b are magnified sectional views comparatively showing an optical sheet coated with spherical beads of the present invention and an optical sheet coated with spherical beads varying greatly in particle diameter.
Figure 32B:
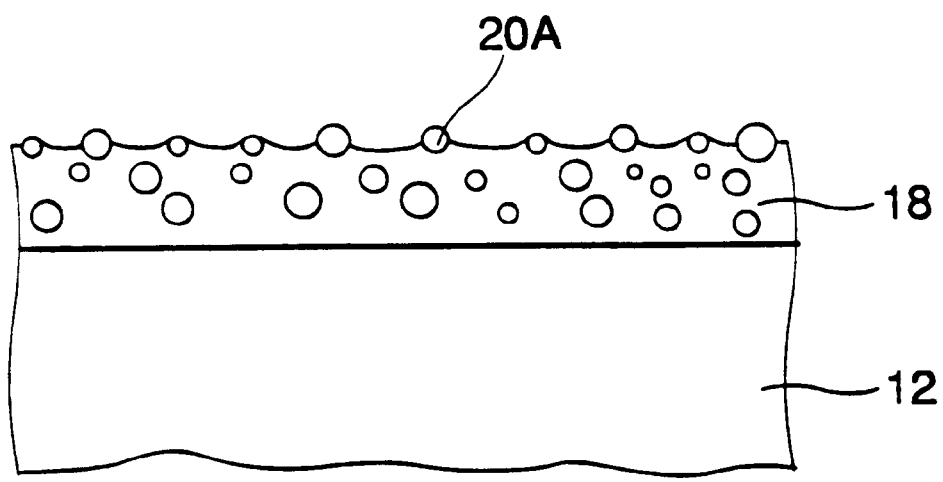

Next, a liquid crystal display apparatus 100 according to an embodiment of the present invention as shown in FIGS. 31 is described.

The liquid crystal display apparatus 100 is formed by arranging a liquid crystal panel 102 at the light outputting surface side of the surface light source device 90, 90A, 90B or 90C as shown in FIGS. 23, 25, 27 or 29.

This liquid crystal display apparatus is of a light-transmissive type, and each of pixels forming its liquid crystal screen is illuminated from the back side with the output light from said surface light source device 90, 90A, 90B or 90C.

In this liquid crystal display apparatus 100, as described above, since no interference fringes appear in the illuminating light from the surface light source device, a good image can be formed.

EMBODIMENT

Next, an embodiment of the present invention is described.

The optical sheet 10 uses an optical sheet which is made by applying a transparent adhesive layer of about 1 μm in thickness onto a transparent biaxially-extended PET film (125 μm in thickness), and applying an ultraviolet-setting resin having as its main ingredient a prepolymer of epoxy acrylate for forming a pattern of unit prisms onto it, and then mold-releasing the coating resin film after it has been hardened and which has unit prisms 14 arranged adjacently to one another so that their ridge-lines 14A are in parallel with one another at intervals of 30 μm, each of said unit prisms being an isosceles having a vertical angle of 85° in section. The spherical beads 20 are disposed in the following manner on the opposite (reverse surface to the prism surface 16 of the transparent base sheet 12 having the unit prisms 14 formed on it.

A coating material composed of light-transmissive beads of a bridge-structured acryl resin (refractive index n=1.49) having an average particle diameter of 5 μm as a material for the spherical beads 20 and a polyester resin (refractive index n=1.55) as a binder is applied.

Concretely, an ink containing said light-transmissive beads by 8% of said binder is diluted with a solvent of "MET:toluene=1:1" to a viscosity of 27 seconds in Zahnkapp's viscometer #3.

This ink is applied to the reverse surface of the transparent base sheet 12 having the unit prisms 14 formed on its obverse surface by means of a slit reverse coating method and then the solvent is dried to harden the coated film.

The spherical beads 20 having a 10-point average roughness Rz of 3 μm according to JIS B0601 in the Japanese Industrial Standards have been formed in a two-dimensionally random distribution having an average interval d of 30 μm.

When observing an optical sheet 10 formed in such a way, for example, in a state where it is in contact with the light outputting surface of the light guide means 52 in a darkroom, no interference fringes have been observed.

The following table 1 shows the result of observing a surface light source device, as shown in FIGS. 13 to 21, having each of optical sheets built in it, which optical sheets have the light-transmissive beads having the various average particle diameters and are similar to the above-mentioned optical sheets.

TABLE 1

|  | Average beads diameter | 10-point average roughness $R_z$ | Interference fringe |
|---|---|---|---|
| Embodiment 1 | 5 μm | 3 μm | No |
| Embodiment 2 | 3 | 2 | No |
| Embodiment 3 | 1.5 | 1 | No |
| Embodiment 4 | 8 | 5 | No |
| Embodiment 5 | 10 | 7 | No |
| Comparison Example 1 | 15 | 9 | Observed |

As a result, interference fringes have been observed only in the comparison example 1 in Table 1.

When a single optical sheet of embodiment 1 in Table 1 and an optical sheet having the obverse surface having unit prisms each of which is an isosceles-triangular prism whose vertical angle is 90° and the reverse surface which is flat and smooth are assembled, as shown in FIG. 16, in said surface light source device, an exemplary embodiment is obtained.

As a result of experiments in which an optical sheet coated with spherical beads 20 having a particle diameter distribution according to the present invention and an optical sheet coated with spherical beads 20A having another particle diameter distribution more greatly varying in particle diameter are respectively dragged, for example, in a state where the spherical beads side of each of them is in contact with a prism surface and a 10-g weight is put on it, the greater the particle diameter distribution is in variation in particle diameter, the more flaws have been generated.

Particularly, when the half bandwidth of the distribution of particle diameters is 1 μm or less, flaws on the prism surface are remarkably small in number.

A light diffusing layer 32 of the optical sheet 30 which is a light diffusing sheet is formed by applying a coating material composed of light-transmissive beads of a bridge-structured acryl resin (refractive index n=1.49) having an average particle diameter of 5 μm as a material for the spherical beads and a polyester resin (refractive index n=1.55) as a binder.

The coating layer 18 containing the spherical beads 20 is disposed on the opposite (reverse) surface to the light diffusing layer 32 of this transparent base sheet 12, in the following manner similarly to said embodiment.

When observing an optical sheet 30 formed in such a way, for example, in a state where it is in contact with the light outputting surface of the light guide means 52 in a darkroom, no interference fringes have been observed.

The prism sheet 36 uses an optical sheet which is made by applying a transparent adhesive layer of about 1 μm in thickness onto a transparent biaxially-extended PET film (125 μm in thickness), and applying an ultraviolet-setting resin having as its main ingredient a prepolymer of epoxy acrylate for forming a pattern of unit prisms onto it, and then mold-releasing the coating resin film after it has been hardened and which has unit prisms 14 arranged adjacently to one another so that their ridge-lines 14A are in parallel with one another at intervals of 30 μm, each of said unit prisms being an isosceles having a vertical angle of 85° in section.

A result of observing a surface light source device, as shown in FIGS. 23 to 30, having each of optical sheets built in it, which optical sheets have the light-transmissive beads having the various average particle diameters and are similar to the above-mentioned light diffusing sheet, has shown the same result as the table 1 as described above.

When a single optical sheet which is a light diffusing sheet corresponding to embodiment 1 in Table 1 and a prism sheet which has the obverse surface having unit prisms each of which is an isosceles-triangular prism whose vertical angle is 90° are assembled as shown in FIG. 23, such defects as flaws and the like of the optical sheet have been covered and an optical distribution of the output light has been made more smooth.

As a result of experiments in which an optical sheet which is a light diffusing sheet coated with spherical beads 20 having a particle diameter distribution according to the present invention and an optical sheet coated with spherical beads 20A having another particle diameter distribution more greatly varying in particle diameter are respectively dragged, for example, in a state where the spherical beads side of each of them is in contact with a prism surface and a 10-g weight is put on it, the greater the particle diameter distribution is in variation in particle diameter, the more flaws have been generated.

Particularly, when the half bandwidth of the distribution of particle diameters is 1 μm or less, flaws on the prism surface are remarkably small in number.

Further particularly, in case that the vertical angles on the optical sheet are as sharp as 100° or less, damage of the prism surface has been greatly influenced by variation in particle diameter of said beads.

What is claimed is:

1. An optical sheet lamination which is formed by laminating together plural optical sheets containing unit prisms, wherein each optical sheet has plural unit prisms arranged on one surface of a light-transmissive base material and the other surface being covered with a coating layer formed out of a light-transmissive material, said coating layer contains light-transmissive spherical beads of 1 $\mu$m or less in half bandwidth of the distribution of particle diameters, and said coating layer in the laminated optical sheet is in contact with unit prisms on an adjacently laminated optical sheet.

2. An optical sheet lamination as defined in claim 1, wherein the vertical angle of the tops of the prisms on another optical sheet in contact with the coating layer is as sharp as in 100° or less.

3. An optical sheet lamination which is formed by laminating together one or more optical sheets each of which has a light-transmissive base material having one surface having a light diffusing layer and the other surface covered with a coating layer formed out of a light-transmissive material, said coating layer contains light-transmissive spherical beads of 1 $\mu$m or less in half bandwidth of the distribution of particle diameters, and one or more optical sheets each of which has plural unit prisms arranged on the surface of a light-transmissive base material, wherein said coating layer in an laminated optical sheet is in contact with unit prisms on another optical sheet laminated adjacently to said laminated optical sheet.

4. An optical sheet lamination as defined in claim 3, wherein the vertical angle of the tops of the prisms on another optical sheet in contact with the coating layer is as sharp as in 100° or less.

* * * * *